US008644970B2

(12) United States Patent
Oh et al.

(10) Patent No.: US 8,644,970 B2
(45) Date of Patent: Feb. 4, 2014

(54) METHOD AND AN APPARATUS FOR PROCESSING AN AUDIO SIGNAL

(75) Inventors: Hyen-O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1095 days.

(21) Appl. No.: 12/602,946

(22) PCT Filed: Jun. 9, 2008

(86) PCT No.: PCT/KR2008/003201
§ 371 (c)(1), (2), (4) Date: Dec. 3, 2009

(87) PCT Pub. No.: WO2008/150141
PCT Pub. Date: Dec. 11, 2008

(65) Prior Publication Data

US 2010/0145487 A1 Jun. 10, 2010

Related U.S. Application Data

(60) Provisional application No. 60/942,967, filed on Jun. 8, 2007.

(51) Int. Cl.
*G06F 17/00* (2006.01)

(52) U.S. Cl.
USPC ........ 700/94

(58) Field of Classification Search
USPC ........ 700/94; 369/1-12; 381/119; 704/500-504
See application file for complete search history.

(56) References Cited

U.S. PATENT DOCUMENTS

| | | | | |
|---|---|---|---|---|
| 6,952,677 | B1 | 10/2005 | Absar et al. | |
| 2005/0074127 | A1* | 4/2005 | Herre et al. | 381/20 |
| 2005/0157883 | A1 | 7/2005 | Herre et al. | |
| 2006/0233380 | A1* | 10/2006 | Holzer et al. | 381/23 |
| 2008/0170711 | A1 | 7/2008 | Breebaart et al. | |
| 2010/0235171 | A1 | 9/2010 | Takagi et al. | |

FOREIGN PATENT DOCUMENTS

| | | | |
|---|---|---|---|
| EP | 1667111 | A1 | 6/2006 |
| JP | 2005-523480 | A | 8/2005 |
| JP | 2007-531027 | A | 11/2007 |
| JP | 2007-532960 | A | 11/2007 |
| JP | 2008-530616 | A | 8/2008 |
| JP | 2009-500656 | A | 1/2009 |
| WO | WO 2005/086139 | A1 | 9/2005 |

(Continued)

OTHER PUBLICATIONS

Faller, et al., "Binaural Cue Coding—Part II: Schemes and Applications", IEEE Transactions on Speech and Audio Processing, vol. 11, No. 6, Nov. 1, 2003, pp. 520-531 (XP011104739).

(Continued)

*Primary Examiner* — Andrew C Flanders
(74) *Attorney, Agent, or Firm* — Birch, Stewart, Kolasch & Birch, LLP

(57) ABSTRACT

A method of processing an audio signal is disclosed. The present invention includes receiving downmix information of at least one downmixed object signal, obtaining side information including object information, and mix information, generating plural channel information based on the side information and the mix information, and generating an output channel signal from the downmix information using the plural channel information, wherein the object information includes at least one of level information of the object signal, correlation information of the object signal, gain information of the object signal and supplementary information thereof.

5 Claims, 13 Drawing Sheets

(56) References Cited

FOREIGN PATENT DOCUMENTS

| | | | |
|---|---|---|---|
| WO | WO 2005/101370 | A1 | 10/2005 |
| WO | WO 2005/101371 | A1 | 10/2005 |
| WO | WO 2008/082276 | A1 | 7/2006 |
| WO | WO 2006/089570 | A1 | 8/2006 |
| WO | WO 2007/004828 | A2 | 1/2007 |
| WO | WO 2007/010785 | A1 | 1/2007 |
| WO | WO 2007/013775 | A1 | 2/2007 |
| WO | WO 2008/088593 | A1 | 6/2008 |

OTHER PUBLICATIONS

Jeongil Seo et al., "Update of Multichannel Visualization Tool for MPEG Surround", Joint Video Team (JVT) of ISO/IEC MPEG & ITU-T VCEG(ISO/IEC JTC1/SC29/WG11 and ITU-T SG16 Q6), No. M13552, Jul. 12, 2006, XP030042221, pp. 1-11.

Liebchen et al., "Improved Forward-Adaptive Prediction for MPEG-4 Audio Lossless Coding", AES 118th Convention paper, May 28-31, 2005, pp. 1-10.

Liebchen et al., "Lossless Audio Coding Using Adaptive Multichannel Prediction", AES 113th Convention Paper, Oct. 5-8, 2002, pp. 1-7.

Liebchen et al., "Lossless Transform Coding of Audio Signals", AES 102nd Convention Paper, Mar. 22-25, 1997, pp. 1-10.

Liebchen et al., "MPEG-4 Audio Lossless Coding", AES 116th Convention paper, May 8-11, 2004, pp. 1-9.

Liebchen et al., "MPEG-4 Lossless Coding for High-Definition Audio", AES 115th Covention Paper, Oct. 10-13, 2003, pp. 1-6.

Liebchen et al., "The MPEG-4 Audio Lossless Coding (ALS) Standard—Technology and Applications", AES (Audio Engineering Society) 119th Convention Paper, Oct. 7-10, 2005, pp. 1-14.

Noll et al., "Digital Audio: From Lossless to Transparent Coding", Proceedings IEEE Signal Processing Workshop, 1999, pp. 53-60.

Yang et al., "A Lossless Audio Compression Scheme with Random Access Property", IEEE ICASSP 2004 Proceeding, May 17-21, 2004, pp. III-1016 trough III-1019.

* cited by examiner

FIG. 9

```
val = Hdecoding(hcb_type_t);
if( sum (val) !=0 ) {
      uni_sign;
      if( uni_sign == TRUE ) {
         sign_for_all;
      }
      else {
         for( k=0; k < npart; k++ ) {
            if( val[k] ) {
                  sign_per_val;
            }
         }
      }
}
```

METHOD AND AN APPARATUS FOR PROCESSING AN AUDIO SIGNAL

This application is the National Phase of PCT/KR2008/003201 filed on Jun. 9, 2008, which claims priority under 35 U.S.C. 119(e) to U.S. Provisional Application Nos. 60/942,967 filed on Jun. 8, 2007. All of which are hereby expressly incorporated by reference into the present application.

TECHNICAL FIELD

The present invention relates to a method and apparatus for processing an audio signal, and more particularly, to an apparatus for processing an audio signal and method thereof. Although the present invention is suitable for a wide scope of applications, it is particularly suitable for processing the audio signal received via digital medium, broadcast signal or the like.

BACKGROUND ART

Generally, in processing an object-based audio signal, a single object constructing an input signal is processed as an independent object. In this case, since correlation may exist between objects, more efficient coding is enabled in case of performing coding using the correlation.

DISCLOSURE OF THE INVENTION

Technical Problem

The object of the present invention is to raise efficiency in processing an audio signal.

Technical Solution

Accordingly, the present invention is directed to an apparatus for processing an audio signal and method thereof that substantially obviate one or more of the problems due to limitations and disadvantages of the related art.

An object of the present invention is to provide a method of processing a signal, by which the signal can be more efficiently processed using an auxiliary parameter in processing an object-based audio signal.

Another object of the present invention is to provide a method of processing a signal, by which the signal can be more efficiently processed by controlling object signal in partial.

Another object of the present invention is to provide a method of processing a signal, by which an object-based audio signal is processed using correlation between objects.

Another object of the present invention is to provide a method of obtaining information indicating correlation between grouped objects.

Another object of the present invention is to provide a method of transmitting a signal, by which the signal can be more efficiently transmitted.

Another object of the present invention is to provide a method of processing a signal, by which various sound effects can be obtained.

A further object of the present invention is to provide a method of processing a signal, which enables a user to modify a mix signal using a source signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving downmix information of at least one downmixed object signal, obtaining side information including object information, and mix information, generating plural channel information based on the side information and the mix information, and generating an output channel signal from the downmix information using the plural channel information, wherein the object information includes at least one of level information of the object signal, correlation information of the object signal, gain information of the object signal and supplementary information thereof.

Preferably, the supplementary information includes difference information between a real value of the gain information of the object signal and an estimation value thereof.

Preferably, the mix information is generated based on at least one of position information of the object signal, the gain information of the object signal and playback configuration information of the object signal.

Preferably, the method further includes determining whether to perform a reverse process using the object information and the mix information and when the reverse process is performed according to the determination, obtaining a reverse process gain value for gain compensation, wherein if the number of modified objects is greater than that of non-modified objects, the reverse process indicates that the gain compensation is performed with reference to the non-modified object and wherein the output channel signal is generated based on the reverse process gain value.

Preferably, the level information of the object signal includes the level information modified based on the mix information and the plural channel information is generated based on the modified level information.

More preferably, if a magnitude of a specific object signal is amplified or attenuated with reference to a prescribed threshold, the modified level information is generated by multiplying the level information of the object signal by a constant greater than 1.

To further achieve these and other advantages and in accordance with the purpose of the present invention, a method of processing an audio signal according to the present invention includes receiving downmix information of at least one downmixed object signal, obtaining side information including object information, and mix information, generating plural channel information based on the obtained side information and the obtained mix information, and generating an output channel signal from the downmix information using the plural channel information, wherein the object information includes at least one of level information of the object signal, correlation information of the object signal and gain information of the object signal and wherein at least one of the object information and the mix information is quantized.

Preferably, the method further includes obtaining coupling information indicating whether an object is grouped with other object, wherein the correlation information of the object signal is obtained based on the coupling information.

More preferably, the method further includes obtaining one meta information common to objects grouped based on the coupling information.

In this case, the meta information includes the character number of meta data and each character information of the meta data.

To further achieve these and other advantages and in accordance with the purpose of the present invention, a method of processing an audio signal according to the present invention includes receiving downmix information of at least one downmixed object signal, obtaining side information including object information and coupling information, and mix information, generating plural channel information based on the obtained side information and the obtained mix information, and generating an output channel signal from the downmix information using the plural channel information, wherein the object signal is discriminated into an independent object signal and a background object signal, wherein the object information includes at least one of level information of the object signal, correlation information of the object signal and gain information of the object signal, and wherein the correlation information of the object signal is obtained based on the coupling information.

Preferably, the independent object signal includes a vocal object signal.

Preferably, the background object signal includes an accompaniment object signal.

Preferably, the background object signal includes at least one channel-based signal.

Preferably, the object signal is discriminated into the independent object signal and the background object signal based on flag information.

Preferably, the audio signal is received as a broadcast signal.

Preferably, the audio signal is received via a digital medium.

To further achieve these and other advantages and in accordance with the purpose of the present invention, a computer-readable recording medium includes a program recorded therein wherein the program is provided to execute the method of claim 11.

To further achieve these and other advantages and in accordance with the purpose of the present invention, an apparatus for processing an audio signal according to the present invention includes a downmix processing unit receiving downmix information of at least one downmixed object signal, an information generating unit obtaining side information including object information, and mix information, the information generating unit generating plural channel information based on the obtained side information and the obtained mix information, and a multi-channel decoding unit generating an output channel signal from the downmix information using the plural channel information, wherein the object information includes at least one of level information of the object signal, correlation information of the object signal, gain information of the object signal and supplementary information thereof.

To further achieve these and other advantages and in accordance with the purpose of the present invention, an apparatus for processing an audio signal according to the present invention includes a downmix processing unit receiving downmix information of at least one downmixed object signal, an information generating unit obtaining side information including object information and mix information, the information generating unit generating plural channel information based on the obtained side information and the obtained mix information, and a multi-channel decoding unit generating an output channel signal from the downmix information using the plural channel information, wherein the object information includes at least one of level information of the object signal, correlation information of the object signal and gain information of the object signal and wherein at least one of the object information and the mix information is quantized.

To further achieve these and other advantages and in accordance with the purpose of the present invention, an apparatus for processing an audio signal according to the present invention includes a downmix processing unit receiving downmix information of at least one downmixed object signal, an information generating unit obtaining side information including object information and coupling information, and mix information, the information generating unit generating plural channel information based on the side information and the mix information, and a multi-channel decoding unit generating an output channel signal from the downmix information using the plural channel information, wherein the object signal is discriminated into an independent object signal and a background object signal, wherein the object information includes at least one of level information of the object signal, correlation information of the object signal and gain information of the object signal, and wherein the correlation information of the object signal is obtained based on the coupling information.

It is to be understood that both the foregoing general description and the following detailed description are exemplary and explanatory and are intended to provide further explanation of the invention as claimed.

Advantageous Effects

Accordingly, the present invention provides the following effects or advantages. First of all, in case of object signals having close correlation in-between, it is able to raise efficiency in processing an audio signal using the correlation. Secondly, by transmitting detailed attribute information on each object, a user-specific object can be controlled directly and finely.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 is a diagram of syntax structure for transmitting an audio signal efficiently according to an embodiment of the present invention;

BEST MODE

Mode for Invention

Reference will now be made in detail to the preferred embodiments of the present invention, examples of which are illustrated in the accompanying drawings.

General terminologies used currently and globally are selected as terminologies used in the present invention. And, there are terminologies arbitrarily selected by the applicant for special cases, for which detailed meanings are explained in detail in the description of the preferred embodiments of the present invention. Hence, the present invention should be understood not with the names of the terminologies but with the meanings of the terminologies.

Specifically, information described in this disclosure should be understood as the terminology including values, parameters, coefficients, elements and the like and can be construed as different not to restrict the present invention.

Figure 1:
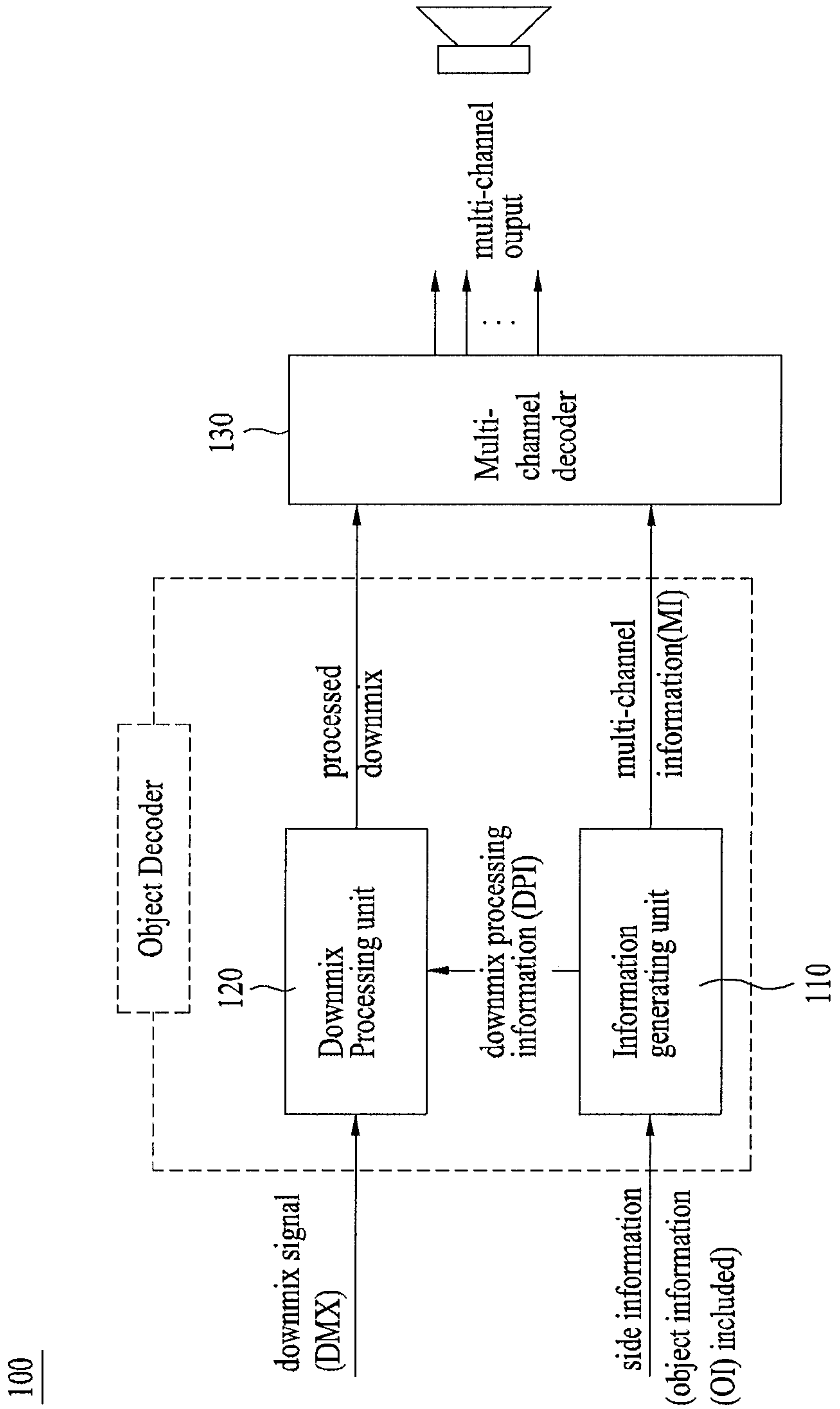
FIG. 1 is a diagram of an audio signal processing apparatus according to an embodiment of the present invention.

FIG. 1 is a diagram of an audio signal processing apparatus according to an embodiment of the present invention.

Referring to FIG. 1, an audio signal processing apparatus according to an embodiment of the present invention can include an information generating unit 110, a downmix processing unit 120 and a multi-channel decoder 130.

The information generating unit 110 receives side information including object information (OI) and the like via audio signal bitstream and is also able to receive mix information (MXI) via user interface. In this case, the object information (OI) is the information on object included within a downmix signal and may include object level information, object correlation information, object gain information, meta information and the like.

The object level information is generated from normalizing an object level using reference information. The reference information corresponds to one of object levels, and more particularly, to a highest one of all object levels. The object correlation information indicates correlation between two objects. The object correlation information is able to indicate that two objects are signals of different channels of a stereo output having the same origin. The object gain information indicates a value about contribution by an object for a channel of each downmix signal, and more particularly, a value to modify contribution by an object.

Moreover, preset information (PI) can indicate the information generated based on preset position information, preset gain information, playback configuration information and the like.

The preset position information can indicate information set to control a position or panning of each object. The preset gain information is the information set to control a gain of each object and includes a gain factor per object. In this case, the gain factor per object may vary according to time.

The preset information (PI) may mean that object position information, object gain information and playback configuration information, which correspond to a specific mode, are preset to obtain specific sound field effect or sound effect for an audio signal. For instance, a karaoke mode in the preset information is able to include preset gain information that sets a gain of vocal object to 0. Stadium mode in the preset information can include preset position information and preset gain information to give an effect that an audio signal is in a wide space. Therefore, a user is facilitated to control a gain or panning of object by selecting a specific mode from the preset information (PI) without adjusting the gain or panning of each object.

The downmix processing unit 120 receives downmix information (hereinafter called a downmix signal (DMX)) and then processes the downmix signal (DMX) using downmix processing information (DPI). In order to adjust a panning or gain of object, it is able to process the downmix (DMX) signal.

The multi-channel decoder 130 receives the processed downmix and is then able to generate a plural channel signal by upmixing the processed downmix signal using multi-channel information (MI).

Downmix signal used in the present invention can include a mono signal, a stereo signal or a plural channel audio signal. For instance, assuming that the stereo signal is set to $\tilde{x}_1(n)$ and $\tilde{x}_2(n)$, it can be represented as a sum of source signals, where 'n' indicates a time index. Hence, the stereo signal can be represented as Formula 1.

[Formula 1]

$$\tilde{x}_1(n) = \sum_{i=1}^{I} a_i \tilde{s}_i(n)$$

$$\tilde{x}_2(n) = \sum_{i=1}^{I} b_i \tilde{s}_i(n),$$

In this case, 'I' indicates the number of source signals included in the stereo signal and the $\tilde{s}_i(n)$ indicates a source signal. And, '$a_i$' and '$b_i$' are values for determining an amplitude panning and a gain for each source signal, respectively. Every $\tilde{s}_i(n)$ may be independent. The $\tilde{s}_i(n)$ can be a pure source signal or can include a pure source signal to which a little reverberation and sound effect signal components are added. For instance, a specific reverberation signal component can be represented as two source signals, i.e., a signal mixed to a left channel and a signal mixed to a right channel.

An embodiment of the present invention is able to modify a stereo signal including source signals in order to remix M source signals ($0 \le M \le I$). The source signals can be remixed into a stereo signal with different gain factors. A remix signal can be represented as Formula 2.

[Formula 2]

$$\tilde{y}_1(n) = \sum_{i=1}^{M} c_i \tilde{s}_i(n) + \sum_{i=M+1}^{I} a_i \tilde{s}_i(n)$$

$$\tilde{y}_2(n) = \sum_{i=1}^{M} d_i \tilde{s}_i(n) + \sum_{i=M+1}^{I} b_i \tilde{s}_i(n),$$

In Formula 2, '$c_i$' and '$d_i$' are new gain factors for M source signals to be remixed. The '$c_i$' and '$d_i$' can be provided by a decoder side.

According to an embodiment of the present invention, a transported input channel signal can be modified into an output channel signal based on mix information.

In this case, the mix information (MXI) can indicate the information generated based on object position information, object gain information, playback configuration information or the like. In this case, the object position information can indicate the information inputted by a user to control a position or panning of each object. The object gain information can indicate the information inputted by a user to control a gain of each object. And, the playback configuration information is the information including the number of speakers, positions of speakers, ambient information (virtual position of speaker) and the like. The playback configuration information is inputted by a user, is stored in advance or received from another device.

The mix information is able to directly indicate an extent that a specific object is included in a specific output channel or is able to indicate a difference value for a state of an input channel. The mix information can use the same value within a single content or a time-variable value. In case that the mix information is time-variable, it is possible to use the mix information by inputting a start state, an end state and a variation time. And, it is also possible to use the mix information by inputting a time index of a varying timing point and a value for a state for the timing point.

For clarity and convenience of description, an embodiment of the present invention describes a case that the mix information indicates an extent that a specific object is included in a specific output channel in the form shown in Formula 1. In this case, each output channel can be constructed as Formula 2. In this case, in order to discriminate $a_i$ and $b_i$ from $c_i$ and $d_i$, assume that the $a_i$ and $b_i$ are mix gains and assume that the $c_i$ and $d_i$ are playback mix gains.

Assume that the mix information is not given as the playback mix gain but given as gain and panning. The gain ($g_i$) and the panning ($l_i$) can be given as Formula 3.

$$g_i=10\log_{10}(c_i^2+d_i^2)$$

$$l_i=20\log_{10}(d_i/c_i) \quad \text{[Formula 3]}$$

Hence, it is able to obtain the $c_i$ and $d_i$ using the $a_i$ and $b_i$. And, it is apparent that the relational expression between the gain and panning and the mix gain can be represented as a different form.

Figure 2:
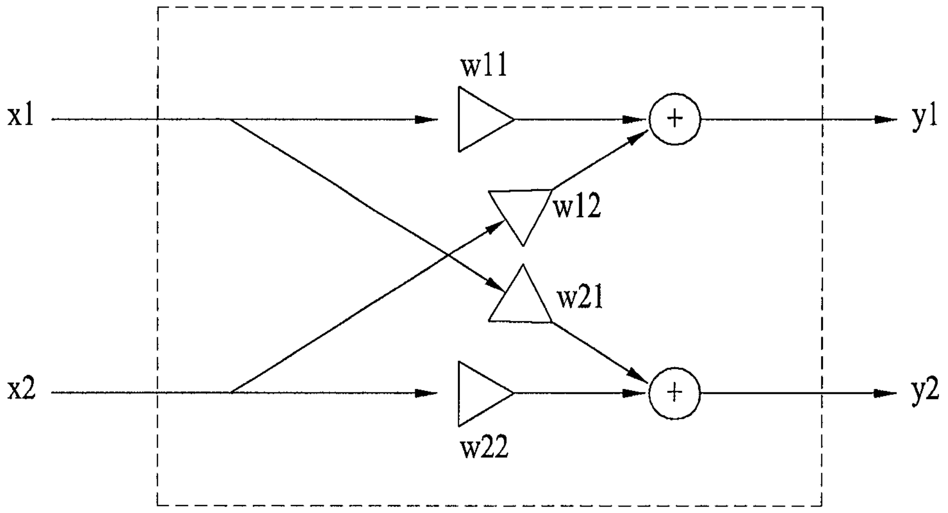
FIG. 2 is a diagram to explain a method of generating an output channel signal using mix information according to an embodiment of the present invention.

FIG. 2 is a diagram to explain a method of generating an output channel signal using mix information according to an embodiment of the present invention.

The downmix processing unit 120 shown in FIG. 1 is able to obtain an output channel signal by multiplying an input channel signal by a specific coefficient. Referring to FIG. 2, assume that x1 and x2 are input channel signals and assume that y1 and y2 are output channel signals, the real output channel signals can be represented as Formula 4.

$$y1\_hat=w11*x1+w12*x2$$

$$y2\_hat=w21*x1+w22*x2 \quad \text{[Formula 4]}$$

In formula 4, yi_hat indicates an output value to be discriminated from a theoretical value derived from Formula 2. 'w11~w22' may mean weighting factors. And, xi, wij and yi may correspond to signals of specific frequencies at specific time, respectively.

One embodiment of the present invention provides a method of obtaining an efficient output channel using weighting factors.

The weighting factors can be estimated in various ways. Particularly, the present invention may use least square estimation. In this case, a generated estimation error can be defined as Formula 5.

$$e1=y1-y1\_hat$$

$$e2=y2-y2\_hat \quad \text{[Formula 5]}$$

The weighting factors can be generated per subband to minimize mean square errors $E\{e1^2\}$ and $E\{e2^2\}$. In this case, if the estimation error is orthogonal to x1 and x2, it is able to use the fact that the mean square error is minimized. Moreover, w11 and w12 can be represented as Formula 6.

$$w_{11}=\frac{E\{x_2^2\}E\{x_1y_1\}-E(x_1x_2)E\{x_2y_1\}}{E\{x_1^2\}E\{x_2^2\}-E^2\{x_1x_2\}} \quad \text{[Formula 6]}$$

$$w_{12}=\frac{E\{x_1x_2\}E\{x_1y_1\}-E\{x_1^2\}E\{x_2y_1\}}{E^2\{x_1x_2\}-E\{x_1^2\}E\{x_2^2\}}.$$

And, $E\{x_1y_1\}$ and $E\{x_2y_1\}$ can be generated as Formula 7.

$$E\{x_1y_1\}=E\{x_1^2\}+\sum_{i=1}^{M}a_i(c_i-a_i)E\{s_i^2\} \quad \text{[Formula 7]}$$

$$E\{x_2y_1\}=E\{x_1x_2\}+\sum_{i=1}^{M}b_i(c_i-a_i)E\{s_i^2\}.$$

Likewise, w21 and w22 can be represented as Formula 8.

$$w_{21}=\frac{E\{x_2^2\}E\{x_1y_2\}-E\{x_1x_2\}E\{x_2y_2\}}{E\{x_1^2\}E\{x_2^2\}-E^2\{x_1x_2\}} \quad \text{[Formula 8]}$$

$$w_{22}=\frac{E\{x_1x_2\}E\{x_1y_2\}-E\{x_1^2\}E\{x_2y_2\}}{E^2\{x_1x_2\}-E\{x_1^2\}E\{x_2^2\}},$$

And, $E\{x_2y_1\}$ and $E\{x_2y_2\}$ can be generated as Formula 9.

$$E\{x_1y_2\}=E\{x_1x_2\}+\sum_{i=1}^{M}a_i(d_i-b_i)E\{s_i^2\} \quad \text{[Formula 9]}$$

$$E\{x_2y_2\}=E\{x_2^2\}+\sum_{i=1}^{M}b_i(d_i-b_i)E\{s_i^2\}.$$

According to an embodiment of the present invention, in order to configure side information or generate an output signal in object-based coding, it is able to use energy information (or level information) of an object signal.

For instance, in case of configuring side information, it is possible to transport energy of an object signal, a relative energy value between object signals or a relative energy value between an object signal and a channel signal. Moreover, in case of generating an output signal, it is able to use energy of an object signal.

Using an input channel signal, side information and mix information, it is able to generate an output channel signal having a specific sound effect. In the process for generating the output channel signal, it is able to use energy information of an object signal. The energy information of the object signal can be included in the side information or may be estimated using the side information and the channel signal. Moreover, it is possible to use the energy information of the object signal by modifying it.

A method of modifying the energy information of the object signal according to an embodiment of the present invention is proposed to improve a quality of the output channel signal. According to the present invention, it is able to modify energy information under the control of a user.

Referring to Formula 7 and Formula 9, it can be observed that energy information $E\{s_i^2\}$ of an object signal is used to obtain weighting factors W11~w22 for the generation of an output channel signal. Embodiment of the present invention relates to a method of generating an output signal using self-channel coefficients w11 and w22 and cross channel coefficients w21 and w12. In case of using another method, as mentioned in the above description, it is apparent that energy information of an object signal is available.

In a process for obtaining weighting factors of an output channel, the present invention proposes a method of modifying to use level information (or energy information) of an object signal. For instance, Formula 10 is available.

$$E\{x1*y1\}=E\{x1^2\}+\Sigma[a_i*(c_i-a_i)E\_mod\ \{s_i^2\}]$$

$$E\{x2*y1\}=E\{x1*x2\}+\Sigma[b_i*(c_i-a_i)E\_mod\ \{s_i^2\}]$$

$$E\{x1*y2\}=E\{x1*x2\}+\Sigma[a_i*(d_i-b_i)E\_mod\ \{s_i^2\}]$$

$$E\{x2*y2\}=E\{x2^2\}+\Sigma[b_i*(d_i-b_i)E\_mod\ \{s_i^2\}] \quad \text{[Formula 10]}$$

The modified level information (E_mod) is independently applicable according to an object signal or identically applicable to every object signal.

The modified level information of the object signal can be generated based on mix information. And, it is able to generate plural channel information based on the modified level information. For instance, in case of changing a magnitude of a specific object signal considerably, it is able to obtain level information modified by multiplying level information of the specific object signal by a predetermined value. In this case, it is able to determine whether the magnitude of the specific object signal is considerably amplified or attenuated with reference to a prescribed threshold. For instance, the prescribed threshold can be a value relative to a magnitude of another object signal. For another instance, the prescribed threshold can be a specific value according to perceptional psychology of human or a calculated value according to various tests. And, the predetermined value, by which the level information of the specific object signal is multiplied, can include a constant greater than 1. In the following description, the above instances will be explained in detail.

'E_mod $\{s_i^2\}$' of Formula 10 can be modified as Formula 11 using $E\{s_i^2\}$.

$$E\_mod\ \{s_i^2\}=alpha*E\{s_i^2\} \quad \text{[Formula 11]}$$

In Formula 11, 'alpha' can be given according to the relation with playback mix information and original mix gain as follows. In case that energy information of an object signal is independently modified according to each object signal, it is apparent that the alpha can be represented as alpha_i. For instance, if $s_i$ is considerably attenuated, it may be alpha>1. If $s_i$ is appropriately attenuated or amplified, it may be alpha=1. If $s_i$ is considerably amplified, it may be alpha>1.

In this case, it is able to know the attenuation or amplification of $s_i$ through the relation between original mix gains $a_i$ and $b_i$ and playback mix gains $c_i$ and $d_i$. For instance, if $a_i^1+b_i^2>c_i^2+d_i^2$, the si is attenuated. On the contrary, if $a_i^1+b_i^2<c_i^2+d_i^2$, the si is amplified. Hence, it is possible to adjust the alpha value by the scheme represented as Formulas 12 to 14.

$$(a_i^2+b_i^2)/(c_i^2+d_i^2)>Thr\_atten$$

$$alpha=alpha\_atten,\ alpha\_atten>1 \quad \text{[Formula 12]}$$

$$(a_i^2+b_i^2)/(c_i^2+d_i^2)>Thr\_boost$$

$$alpha=alpha\_boost,\ alpha\_boost>1 \quad \text{[Formula 13]}$$

$$Thr\_atten>(a_i^2+b_i^2)/(c_i^2+d_i^2)>Thr\_boost$$

$$alpha=1 \quad \text{[Formula 14]}$$

In this case, the Thr_atten and the Thr_boost may mean thresholds. Each of the threshold can be a specific value according to perceptional psychology of human or a calculated value according to various tests. And, the alpha_atten can have the characteristic of alpha_atten alpha_boost.

In the present invention, it is able to use the alpha_atten to enable E_mod $\{s_i^2\}$ to obtain a gain of 2 dB compared to that of $E\{s_i^2\}$.

Moreover, in the present invention, it is able to use $10^{0.2}$ as the alpha_atten value.

According to another embodiment of the present invention, it is able to use independent E_mod $\{s_i^2\}$ to obtan weighting factors instead of using the same E_mod $\{s_i^2\}$.

For instance, Formula 15 is available.

$$E\{x1*y1\}=E\{x1^2\}+\Sigma[a_i*(c_i-a_i)E\_mod\ 1\{s_i^2\}]$$

$$E\{x2*y1\}=E\{x1*x2\}+\Sigma[b_i*(c_i-a_i)E\_mod\ 1\{s_i^2\}]$$

$$E\{x1*y2\}=E\{x1*x2\}+\Sigma[a_i*(d_i-b_i)E\_mod\ 2\{s_i^2\}]$$

$$E\{x2*y2\}=E\{x2^2\}+\Sigma[b_i*(d_i-b_i)E\_mod\ 2\{s_i^2\}] \quad \text{[Formula 15]}$$

Likewise, E_mod $1\{s_i^2\}$ and E_mod $2\{s_i^2\}$ of Formula 15 can be modified as Formula 16.

$$E\_mod\ 1\{s_i^2\}=alpha1*E\{s_i^2\}$$

$$E\_mod\ 2\{s_i^2\}=alpha2*E\{s_i^2\} \quad \text{[Formula 16]}$$

In this case, E_mod 1 and alpha1 are values contributed to the generation of y1 and E_mod 2 and alpha2 are values contributed to the generation of y2.

E_mod_i$\{s_i^2\}$ used for Formula 11 can be used by being discriminated as follows. For instance, assume that $s_i$ is attenuated/amplified for one channel of an output channel signal only. In this case, $E\{S_i^2\}$ needs not to be modified and used for an opposite channel. If so, if $s_i$ is suppressed for a left channel only, it is able to use E_mod value for w11 and w12 used in generating a left output channel signal only. In this case, if is able to use alpha1=alpha_atten and alpha2=1. And, Formulas 12 to 14 are usable as the condition for determining a value of alpha_i. In particular, by determining an extent that a specific object signal is attenuated/amplified on a specific output channel, it is able to use the alpha_i value.

Formula 17 and Formula 18 are available for another embodiment of the present invention.

$$E\{x1*y1\}=E\{x1^2\}+\Sigma[a_i*(c_i-a_1)E\_mod\ 11\{s_i^2\}]$$

$$E\{x2*y1\}=E\{x1*x2\}+\Sigma[b_i*(c_i-a_i)E\_mod\ 21\{s_i^2\}]$$

$$E\{x1*y2\}=E\{x1*x2\}+\rho[a_i*(d_i-b_i)E\_mod\ 12\{s_i^2\}]$$

$$E\{x2*y2\}=E\{x2^2\}+\Sigma[b_i*(d_i-b_i)E\_mod\ 22\{s_i^2\}] \quad \text{[Formula 17]}$$

$$E\_mod\ 11\{s_i^2\}=alpha11*E\{s_i^2\}$$

$$E\_mod\ 21\{s_i^2\}=alpha21*E\{s_i^2\}$$

$$E\_mod\ 12\{s_i^2\}=alpha12*E\{s_i^2\}$$

$$E\_mod\ 22\{s_i^2\}=alpha22*E\{s_i^2\} \quad \text{[Formula 18]}$$

According to another embodiment of the present invention, in case that excessive attenuation/amplification is requested, it is able to modify and use $E\{s_i^2\}$ for the enhancement of a quality of output channel signal. Yet, in case of using a cross channel, it may be requested to use the $E\{s_i^2\}$ without modifying it. For this, it is able to satisfy the request by setting alpha21=alpha12=1 to use.

On the contrary, it may be requested that energy information of an object signal is modified not for a self-channel but for a cross channel. In this case, it is able to satisfy the request by setting alpha11=alpha22=1 to use.

Although not explained as an example, by a method similar to that in the above description, it is possible to use alpha11 to alpha22 as arbitrary values. And, an input channel signal, side information, playback mix information and the like can be utilized for the selection of the alpha values. Moreover, the relation between an original mix gain and a playback mix gain can be utilized for the selection of the alpha values.

In the examples, the alpha value is equal to or greater than 1. And, it is understood that a case of the alpha value smaller than 1 can be utilized.

Meanwhile, in an encoder, energy information of an object signal is possible included in side information or a relative energy value between an object signal and a channel signal is possible included in side information. If so, the encoder is able to configure side information by modifying energy information of an object signal. For instance, it is able to configure side information by modifying energy of a specific object signal or energy of entire object signals to maximize a playback effect. In this case, a decoder is able to perform signal processing by reconstructing the modification.

For instance, consider a case that E_mod $\{s_i^2\}$ is transmitted as side information through the transform by Formula 11. In this case, a decoder is able to obtain $E\{s_i^2\}$ by dividing E_mod $\{s_i^2\}$ by alpha. In doing so, the decoder is able to use the selectively transmitted E_mod $\{s_i^2\}$ and/or $E\{s_i^2\}$. The alpha value can be transmitted by being included in the side information. Alternatively, the alpha value can be estimated by the decoder using a transported input channel signal and side information.

According to an embodiment of the present invention, it is able to use weighting factors to generate a user-specific sound effect. In this case, the weighting factors may be used in partial only. For the selection of the weighting factors, it is able to use the relation between input channels, input channel characteristics, characteristics of transmitted side information, mix information, characteristics of an estimated weighting factor. For clarity and convenience, assume that w11 and w22 are self-channel coefficients and w12 and w21 are cross channel coefficients.

According to an embodiment of the present invention, in case of not using weighting factors in part or using the weighting factors in part, it is able to re-estimate the used weighting factors. For instance, after w11, w12, w21 and w22 have been estimated, if it is determined to use a self-channel coefficient only, it may be possible to use w1 and w2 after estimation of the w1 and w2 instead of using w11 and w22. In case of not using the cross channel coefficient, this is because y_i_hat is modified as Formula 18 and because corresponding minimum square estimation is changed.

$$y\_1\_hat=w1*x1$$

$$y\_2\_hat=w2*x2 \quad \text{[Formula 18]}$$

In this case, w1 and w2, which minimize e_i, can be estimated as Formula 19.

$$w1=E\{x1*y1\}/E\{x1^2\}$$

$$w2=E\{x2*y2\}/E\{x2^2\} \quad \text{[Formula 19]}$$

Meanwhile, in case of using weighting factors in part, y_i_hat is modeled to be suitable for the case and an optimal weighting factor is estimated to be used.

Various embodiments for utilizing weighting factors are explained as follows.

As a first embodiment, a method based on coherence of an input channel can exist.

If inter-channel correlation of an input signal is very high, the signals, which are included in channels, respectively, may be very similar to each other. If so, it is able to obtain an effect as if using a cross channel coefficient, despite using a self-channel coefficient only.

For instance, it is able to estimate an extent of correlation using Formula 20.

$$Pi=E\{x1*x2\}/sqrt(E\{x1^2\}E\{x2^2\}) \quad \text{[Formula 20]}$$

In this case, if a value of Pi is greater than a threshold, i.e., if Pi>Pi_Threshold, each of the w12 and w21 can be set to 0. The Pi_Threshold may mean a threshold.

For example, the threshold may be a specific value according to perceptional psychology of human or a calculated according to various tests. It is able to use the conventional w11 and w22 as w11 and w22. Alternatively, it is able to use such weighting factors different from w11 and w22 as w11=w1 and w22=w2. And, the w1 and w2 can be found by a method represented as Formula 19.

As a second method, a method of using a norm of a weighting factor can exist.

In the present embodiment, it is able to select a weighting factor, which will be utilized by the downmix processing unit 120, using the norm of weighting factors.

First of all, it is able to find weighting factors w11~w22 including weighting factors for which cross channel is utilized. In this case, the norm of the weighting factors can be found by Formula 21.

$$A=w11^2+w12^2+w21^2+w22^2 \quad \text{[Formula 21]}$$

And, it is able to find weighting factors w1 and w2 for which the cross channel is not utilized. In this case, the norm of the weighting factors can be found by Formula 22.

$$B=w1^2+w2^2 \quad \text{[Formula 22]}$$

In this case, if A<B, it is able to use weighting factors w11~w22. If B<A, it is able to use weighting factors w1 and w2. Namely, by comparing a case of using four weighting factors and a case of using partial weighting factors to each other, it is able to select a more efficient method. If the above method is used, it is able to prevent a case that a system gets unstable due to considerably big magnitudes of weighting factors.

As a third embodiment, a method of using energy of an input channel can exist.

If w11~w22 are found by a conventional method for a case that a specific channel fails to have energy, i.e., a case that a signal exists on one channel only for example, an unwanted result may be generated. In this case, since an input channel having no energy is unable to contribute to an output, it is able to set a weighting factor of the input channel having no energy to 0.

Whether a specific channel has energy can be estimated by the method represented as Formula 23.

$$E\{xi^2\}<\text{Threshold} \quad \text{[Formula 23]}$$

In this case, it is able to estimate w11 and w12 by a new method in a manner of considering that x2 is the case of having no energy instead of using the value found by the conventional method. Likewise, the threshold value may mean a threshold. For instance, the threshold value may include a specific value according to perceptional psychology of human or a calculated value according to various tests.

For instance, if x2 has no energy, an output signal may be generated as Formula 24.

$$y\_1\_hat = w11 * x1$$

$$y\_2\_hat = w21 * x2 \qquad \text{[Formula 24]}$$

And, w11 and w21 can be estimated as Formula 25.

$$w11 = E\{x1 * y1\}/E\{x1^2\}$$

$$w21 = E\{x1 * y2\}/E\{x1^2\} \qquad \text{[Formula 25]}$$

In this case, it becomes w12=w22=0.

As a fourth embodiment, a method of using mix gain information can exist.

As a case that a weighting factor for a cross channel is necessary for object-based coding, there can exist a case that an output signal of a self-channel is not generated from an input signal of the self-channel. This can take place if a signal included in one channel only (or a signal mainly included in one channel) is transmitted to the other channel. Namely, it can take place in case of attempting to modify a corresponding panning characteristic for an input that a specific object is panned to a specific channel.

In this case, it is able to obtain a specific sound effect only if a weighting factor for a cross channel is used. And, a method of detecting such a case and a method of determining how to use the weighting factor are needed. In the present embodiment, a detection method and a weighting factor utilizing method are proposed.

For instance, it is able to assume a case that a processed object signal is mono. First of all, it is able to determine whether an object signal is mono. If the object signal is mono, it is able to determine whether it is panned to the side. In this case, the determination of the side panning can be performed using ai/bi. In particular, if ai/bi=1, it can be observed that the object signal is included in each channel at the same level. This may mean that the object signal is located at a center in a sound space. If ai/bi<Thr_B, it can be observed that the object signal is panned to the side (right) directed by the bi. On the contrary, if ai/bi>Thr_A, it can be observed that the object signal is panned to the side (left) directed by the ai. In this case, a value of Thr_A or Thr_B may mean a threshold value. For instance, the threshold value may be a specific value according to perceptional psychology of human or a calculated value according to various tests.

As a result of the determination, if the side panning is performed, it is determined whether panning is changed by a playback mix gain. Whether the panning is changed can be determined by comparing a value of ai/bi to a value of ci/di. For instance, assume a state that ai/bi is panned to the right. If ci/di is panned farther to the right, a cross channel coefficient may not be necessary. Yet, if ci/di is panned to the left, the object signal component can be included in a left output channel using the cross channel coefficient.

In case of comparing the value of ai/bi to the value of ci/di, it is able to adjust sensitivity of comparison by applying a suitable weighting factor to ai/bi or ci/di. For instance, instead of comparing ci/di to ai/bi, it is able to use Formula 26.

$$(ci/di) * \text{alpha} > ai/bi$$

$$(ci/di) * \text{beta} < ai/bi \qquad \text{[Formula 26]}$$

In case of using Formula 26, it is able to adjust sensitivity to the use of a cross channel coefficient by adjusting alpha and beta appropriately.

Moreover, although the panning of the side panned object signal is changed, if the object signal fails to have sufficient energy, it is possible to utilize a self-channel coefficient only instead of utilizing a cross channel coefficient. For instance, if an object signal, which is panned in the side and of which panning is changed by a playback mix gain, exists in a front part of a corresponding content and if the object signal does not exist thereafter, it is able to use a cross channel coefficient for a section in which the object signal exists only.

As proposed by the embodiment of the present invention, using energy information of a corresponding object, it is possible to select whether a cross channel coefficient is utilized. Energy of the corresponding object can be transmitted in a form of side information or may be estimated using transmitted side information and an input signal.

As a fifth embodiment, a method of using object characteristics can exist.

In case that an object signal is a plural channel object signal, it can be processed according to the characteristic of the object signal. For clarity and convenience of the following description, assume that the object signal is a stereo object signal.

For a first example, a mono object signal is generated by downmixing a stereo object signal and an inter-channel relation of an original stereo object signal is processed by being represented as sub-side information. In this case, the sub-side information is a terminology to be discriminated from the conventional side information and indicates a sub-concept of side information in hierarchical aspect. In object-based coding, if energy information of object is utilized as side information, energy of the mono object signal can be utilized as side information.

For a second example, it is able to process each channel of an object signal into a single independent mono object signal. For instance, in case that energy information of an object signal is utilized as side information, energy of each channel can be utilized as side information. In this case, the number of side information to be transmitted may be incremented higher than that of the first example.

In case of the first example, it is able to determine whether to utilize a cross channel coefficient according to 'method of using mix gain information' corresponding to the above-described fourth embodiment. In this case, it is able to utilize sub-side information together with the mix gain information.

In case of the second example, if a left channel object signal is s_i, a right channel object signal can become s_i+1. In case of the left channel object signal, it becomes $b_{\_1=}0$. In case of the right channel object signal, it becomes a_i+1=0. In particular, in case of the second example, although the object signal is processed as two mono objects, since it is included in one channel only, it has the characteristic of '$b_{\_1=a\_}i+1=0$'.

In order to perform object-based coding on the stereo object signal in the second example, the following two kinds of methods are available.

As a first method, a case of not using a cross channel coefficient can exist. For instance, assume that a playback mix gain is given as Formula 27.

$$c\_i = \text{alpha}$$

$$c\_i+1 = \text{beta} \qquad \text{[Formula 27]}$$

In case of a stereo object signal, it can be represented as $a_{\_1+}1=0$. In this case, if c_i+1 is not zero, an object signal s_i+1 included in a right side should be included in a left side. Hence, a cross channel coefficient becomes necessary.

Yet, in case of a stereo object signal, it is able to assume that components included in respective channels are similar to each other. This can be represented as Formula 28.

$$c\_i\_hat=c\_i+c\_i+1,$$

$$c\_i+1\_hat=0 \quad \text{[Formula 28]}$$

Hence, it is possible not to use a cross channel coefficient.

Likewise, a cross channel coefficient may not be used through the following processing represented as Formula 29.

$$d\_i\_hat=0$$

$$d\_i+1\_hat=d\_i+d\_i+1 \quad \text{[FIG. 29]}$$

As a second method, a method of using a cross channel coefficient can exist.

In case of attempting a signal included in a left side of a stereo object signal to be included in a right output signal, a cross channel coefficient has to be used. Therefore, by analyzing a playback mix gain, it is able to use a cross channel coefficient only if necessary.

For another instance, in case of a stereo object signal, it is able to further use characteristic of object signal in addition. In case of a stereo object signal, a signal on a specific frequency band in a specific time zone can be configured in a manner that signals very similar to each other construct the respective channel signals. In this case, if a value indicating correlation of a stereo object signal in a decoder is higher than a threshold, the processing represented as Formula 28 or Formula 29 is possible instead of using a cross channel coefficient.

To analyze correlation between channels, it is able to use a method of measuring inter-channel coherence or the like. Alternatively, information on inter-channel coherence of a stereo object signal can be included in a bitstream by an encoder. Alternatively, an encoder processes a stereo object signal into a mono signal in a time/frequency domain having high coherence. And, the encoder performs coding on the stereo object signal by processing it into a stereo signal in a time/frequency domain having low coherence.

As a sixth embodiment, a method of using a selective coefficient can exist.

For instance, a left signal is sent to a right channel. If a right signal is not included in a left channel, it may have better use not w12 but w21. Hence, instead of utilizing every cross coefficient despite using cross channel coefficients, it is able to allow necessary crossings only by checking an original mix gain and a playback mix gain.

As mentioned in the foregoing description, if the panning of a specific object is changed, it is possible to use a cross channel coefficient required for allowing the panning only. If a panning of another object faces an opposite direction, it is possible to use both of the two cross channel coefficients.

For instance, in case that w11, w12 and w22 are used, i.e., in case that w21 is not used, the w11, w12 and w22 can differ from w11, w12 and w22 of the case of utilizing four coefficients w11~w22 entirely. In this case, as mentioned in the above description, the w11, w12 and w22 are usable by modeling $y_{_1}_hat$ and $y_{_2}_hat$ and by minimum square estimation. In this case, since w11 and w12 are used, the $y_{_1}_hat$ is equivalent to that of a general case. Hence, the w11 and w12 can use the previous values as they are. Yet, since w22 is used only, $y_{_2}_hat$ is identical to that of the case of using w2 only. Hence, the w22 can use that of Formula 11.

Therefore, the present invention proposes a method of allowing a mono-directional cross channel coefficient only according to necessity. To determine this, an original mix gain and a playback mix gain are usable.

Moreover, in case of using a mono-directional cross channel coefficient is used, weighting factor estimation can be newly performed.

As a seventh embodiment, a method of using a cross channel coefficient only can exist.

For an input signal having an extreme panning characteristic, in case that each object signal is panned in an opposite direction, using w21 and w12 only may be more efficient than using w11~w22. To use a cross channel coefficient only, the following conditions are available. First condition corresponds to whether a mix gain of an input signal is panned to the side. Second condition corresponds to whether a laterally panned object signal is panned in an opposite direction. Third condition corresponds to the relation between the number of objects satisfying both of the first and second conditions and the total number of objects. And, a fourth condition corresponds to an original panning state of object failing to satisfy both of the first and second conditions and a requested panning state. Yet, in case of the fourth, if an original panning is panned to the side and if a requested panning is panned to the same side, it may not be advantageous in using a cross channel coefficient only.

Moreover, the above-described various methods are selectively usable together or in part.

Figure 3:
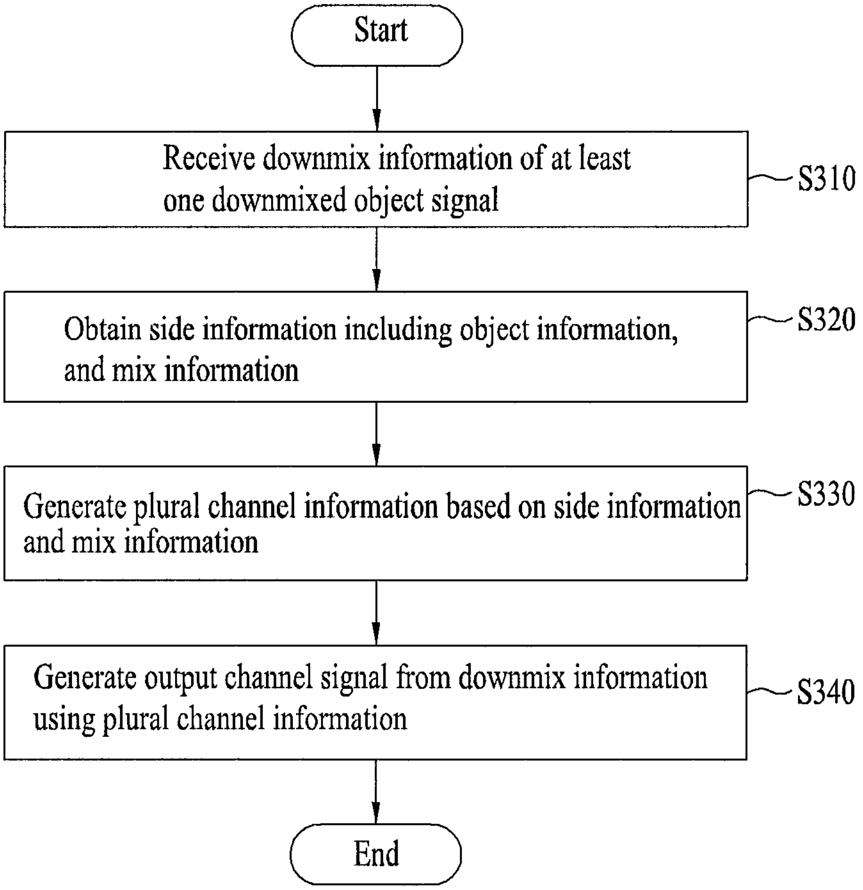
FIG. 3 is a flowchart to explain a more efficient audio signal processing method according to an embodiment of the present invention.

FIG. 3 is a flowchart to explain a more efficient audio signal processing method according to an embodiment of the present invention.

First of all, it is able to receive downmix information in which at least one object signal is downmixed [S310]. And, it is able to obtain side information, in which object information is included, and mix information [S320].

In this case, the object information can include at least one of level information of the object signal, correlation information, gain information and their supplementary information. The supplementary information can include supplementary information of level information, supplementary information of correlation information and supplementary information of gain information. For instance, the supplementary information of the gain information can include difference information between a real value of the gain information of the object signal and an estimated value thereof.

The mix information can be generated based on at least one of position information, gain information and playback configuration information of the object signal.

Plural channel information can be generated based on the side information and the mix information [S330]. And, it is able to generate an output channel signal from the downmix information using the plural channel information [S340]. Detailed embodiments are explained in the following description.

Figure 4:
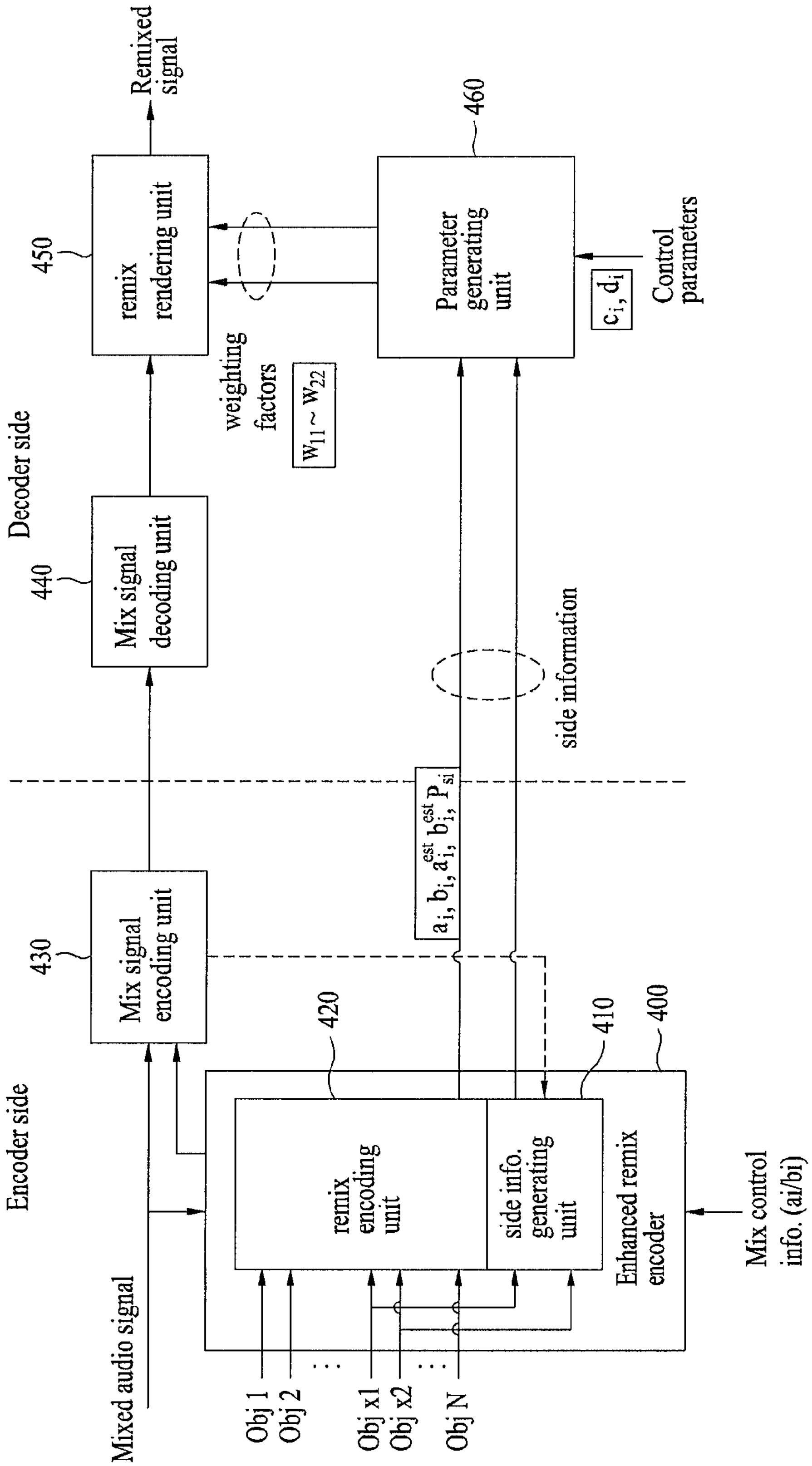
FIG. 4 is a schematic block diagram of an audio signal processing apparatus for transmitting an object signal more efficiently according to an embodiment of the present invention.

FIG. 4 is a schematic block diagram of an audio signal processing apparatus for transmitting an object signal more efficiently according to an embodiment of the present invention.

Referring to FIG. 4, the audio signal processing apparatus can mainly include an enhanced remix encoder 400, a mix signal encoding unit 430, a mix signal decoding unit 440, a parameter generating unit 450 and a remix rendering unit 460. And, the enhanced remix encoder 400 can include a side information generating unit 410 and a remix encoding unit 420.

The side information may be needed to generate weighting factors in performing rendering in the remix rendering unit 460. For instance, the side information can include mix gain estimation values ($a_i\_est$, $b_i\_est$), playback mix gains ($c_i$, $d_i$), energy (Ps) of a source signal and the like. The parameter generating unit 450 can generate the weighting factors using the side information.

According to one embodiment of the present invention, the enhanced remix encoder 400 is able to transmit the estimation value of the mix gain ($a_i$, $b_i$), i.e., the mix gain estimation values ($a_i$_est, $b_i$_est) as the side information. The mix gain estimation value means that the mix gain value ($a_i$, $b_i$) is estimated using a mix signal and respective object signals. In case of transmitting the mix gain estimation value, it is able to generate weighting factors w11~w22 using the mix gain estimation value and $c_i/d_i$. According to another embodiment, an encoder can have a real value of $a_i/b_i$ used for actually mixing respective object signals as separate information. For instance, in case that an encoder generates a mixing signal by itself or in case that a mixing signal is generated externally, it is able to transmit separate mix control information indicating that the $a_i/b_i$ is used for a prescribed value.

For instance, if the $c_i/d_i$ means a remix scene specified by a user and if $a_i/b_i$ means a mixed signal, actual rendering can be performed based on a difference between the two values.

For instance, if control information indicating that $c_i=1$ and $d_i=1.5$ for a specific object of $a_i=1$ and $b_i=1$, it may mean that a left channel signal is maintained intact as ($a_i \rightarrow c_i$) and may mean that a gain of a right channel signal ($b_i \rightarrow d_i$) is amplified by 0.5.

Yet, if the mix gain estimation values ($a_i$_est, $b_i$_est) are transmitted only instead of ai/bi in the above example, a problem may be caused. Since the mix gain estimation values ($a_i$_est, $b_i$_est) are estimated through the calculation in the encoder, they may have values different from the real values $a_i$ and $b_i$, i.e., $a_i$_est=0.9 and $b_i$_est=1.1. In this case, in the decoder, unlike the user's actual intention (amplification of a right channel by 0.5 only), the left channel is amplified by +0.1 gain corresponding to a difference between $a_i$_est and $c_i$ and the right channel is amplified by +0.4. Namely, the control may become different from the user's intention. Therefore, a signal can be more specifically reconstructed if the real values of $a_i$ and $b_i$ are transmitted as well as the mix gain estimation values ($a_i$_est, $b_i$_est).

Meanwhile, if an input of user is inputted as gain and panning instead of being interfaced as $c_i/d_i$, a decoder is able to apply the gain and panning by transforming the gain and panning into a form of $c_i/d_i$. In this case, the transform can be performed with reference to $a_i/b_i$ or $a_i$_est/$b_i$_est.

According to another embodiment, in case that $a_i/b_i$, $a_i$_est and $b_i$_est are transmitted, they can be transmitted as a difference value between $a_i$ and $a_i$ est and a difference value between $b_i$ and $b_i$_est instead of being transmitted as PCM signals, respectively. This is because the $a_i$ and $a_i$_est and the $b_i$ and $b_i$_est have the very similar characteristics. For instance, it is able to transmit $a_i$, $a_i$_delta=$a_i$−$a_i$_est, and $b_i$, $b_i$_delta=$b_i$−$b_i$_est.

According to an embodiment of the present invention, it is able to transmit a quantized value in transmitting mix information. For instance, when a decoder performs remixing using a relative relation between $a_i/b_i$ and $c_i/d_i$, an actually transmitted value can be a quantized value of $a_i$_q/$b_i$_q. In this case, if the quantized $a_i$_q/$b_i$_q is compared to the real number $c_i/d_i$, error may be generated again. Hence, $c_i/d_i$ can use a quantized value of $c_i$_q/$d_i$_q as well.

Meanwhile, $c_i/d_i$ can be inputted to a decoder by a user in general. Moreover, it can be transmitted as a preset value by being included in a bitstream. In this case, the bitstream can be transmitted separately or together with side information.

Bitstream transported from an encoder may include a unified single bitstream containing a downmix signal, object information and preset information. The object information and the preset information can be stored in a side area of the downmix signal bitstream. Alternatively, the object information and the preset information can be stored or transmitted as an independent bit sequence. For instance, a downmix signal can be carried by a first bitstream. Object information and preset information can be carried by a second bitstream. According to another embodiment, a downmix signal and object information can be carried by a first bitstream. And, preset information can be separately carried by a second bitstream. According to a further embodiment, a downmix signal, object information and preset information can be carried by three separate bitstreams, respectively.

The first, second and separate bitstreams may be identical or can be transmitted at different bit rates. In particular, after reconstruction of an audio signal, preset information is separated from a downmix signal or object information and is then stored or transmitted.

According to another embodiment of the present invention, $c_i/d_i$ may be a time-variable value if necessary. In particular, it may be a gain value represented as a function of time. Thus, in order to represent a user mix parameter indicating a playback mix gain as a value according to a time, it can be inputted as a time stamp indicating a timing point of application.

In this case, a time index may be a value indicating a timing point on a time axis to which a following $c_i/d_i$ is applied. Alternatively, a time index may be a value indicating a sample position of a mixed audio signal. Alternatively, in representing the audio signal by a frame unit, a time index may be a value indicating a frame position. In case of a sample value, it can be represented by a specific sample unit only.

Generally, application of $c_i/d_i$ corresponding to a time index can continue until a new time index and $c_i/d_i$ show up. Meanwhile, a time interval value can be used instead of the time index. And, the time interval may mean a section to which a corresponding $c_i/d_i$ is applied.

Moreover, it is able to define flag information, which indicates whether to perform remix, within a bitstream. If the flag information indicates false, $c_i/d_i$ is not transmitted in a corresponding section but a stereo signal by original $a_i/b_i$ can be outputted. In particular, a remix process may not proceed in the corresponding section. In case of constructing a $c_i/d_i$ bitstream by the above method, a bit rate can be minimized. And, it is also able to prevent an unwanted remix from being performed.

Figure 5:
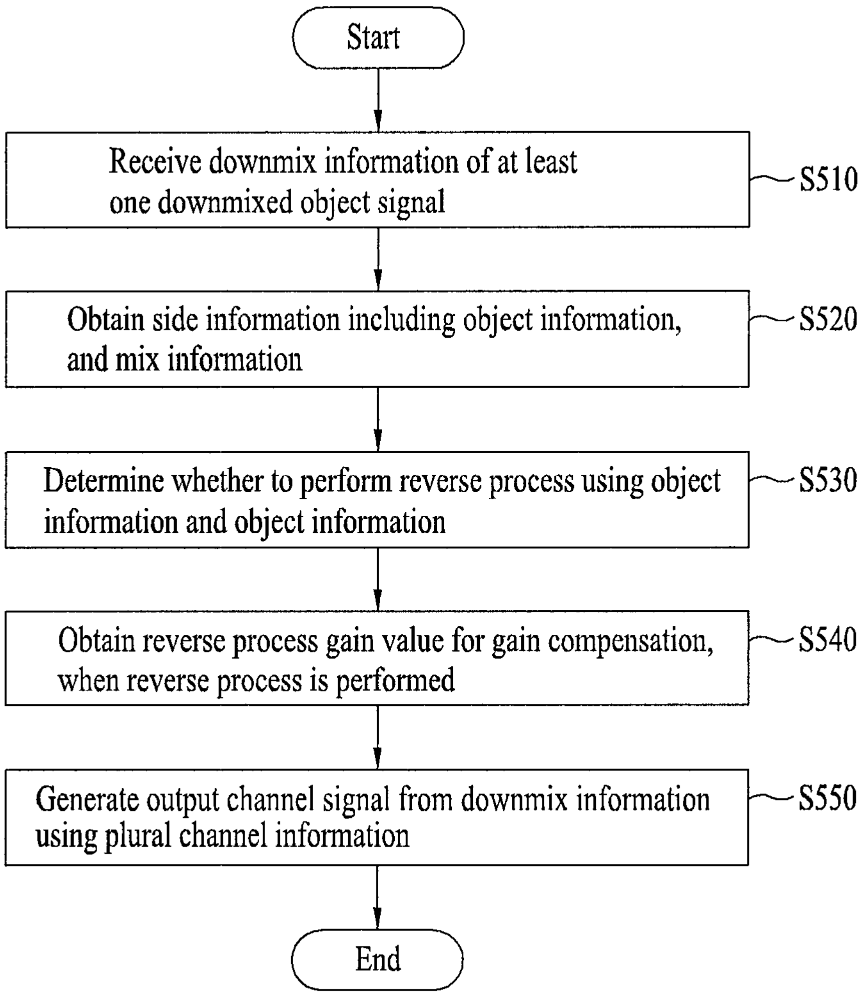
FIG. 5 is a flowchart to explain a method of processing an object signal using reverse control according to an embodiment of the present invention.

FIG. 5 is a flowchart to explain a method of processing an object signal using reverse control according to an embodiment of the present invention.

In performing object-based coding, there may be a case that partial object signals need to be controlled only. For instance, like the case of acapella, the mixing in the form of leaving a specific object signal but suppressing the rest of object signals is available. When vocal exists together with background music, a volume of the background is lowered to enhance the listening to the vocal. Namely, the above case may correspond to a case that the number of changed object signals is greater than the number of unchanged objects signals or a more complicated case. If so, reverse processing is performed and total gain is then compensated, whereby a quality of sound can be further enhanced. For instance, in case of acapella, after a vocal object signal has been amplified only, total gain can be compensated to match a gain value of an original vocal object signal.

Referring to FIG. 5, first of all, it is able to receive downmix information in which at least one object signal is downmixed [S510]. And, it is able to obtain side information, in which object information is included, and mix information [S520].

In this case, the object information can include at least one of level information of the object signal, correlation information, gain information and their supplementary information. The supplementary information can include supplementary information of level information, supplementary information of correlation information and supplementary information of gain information. For instance, the supplementary information of the gain information can include difference information between a real value of the gain information of the object signal and an estimated value thereof. And, the mix information can be generated based on at least one of position information, gain information and playback configuration information of the object signal.

The object signal can be discriminated into an independent object signal and a background object signal. For instance, using flag information, it is able to determine whether the object signal is an independent object signal or a background object signal. The independent object signal can include a vocal object signal. The background object signal can include an accompaniment object signal. And, the background object signal can include at least one channel-based signal. Moreover, using enhanced object information, it is able to discriminate the independent object signal and the background object signal from each other. For instance, the enhanced object information can include a residual signal.

It is able to determined whether to perform reverse processing using the object information and the mix information [S530]. In case that the number of changed objects is greater than that of unchanged objects, the reverse processing means that gain is compensated with reference to the unchanged objects. For instance, in case of attempting to change a gain of an accompaniment object, if the number of accompaniment objects to be changed is greater than that of unchanged vocal objects, it is able to change the gain of the vocal object having the smaller number in reverse. Thus, if the reverse processing is performed, it is able to obtain a reverse processing gain value for the gain compensation [S540]. And, it is able to generate an output channel signal based on the reverse processing gain value [S550].

Figure 6:
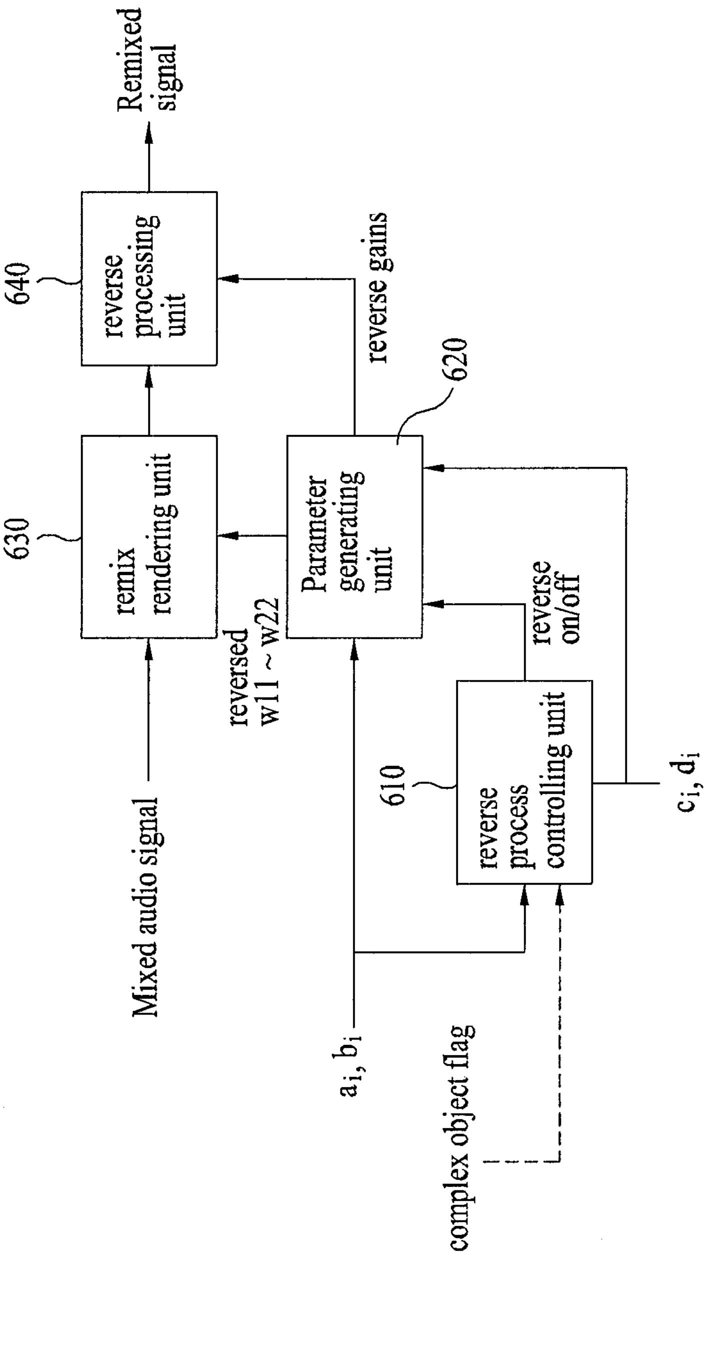
FIG. 6 and FIG. 7 are block diagrams of an audio signal processing apparatus for processing an object signal using reverse control according to another embodiment of the present invention.
Figure 7:
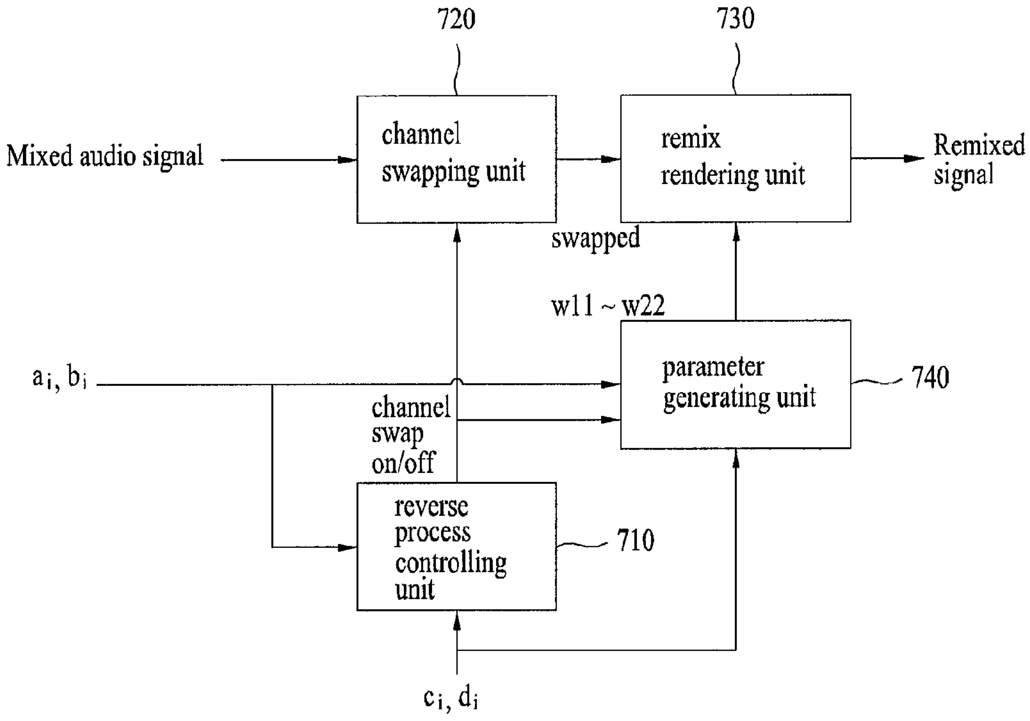

FIG. 6 and FIG. 7 are block diagrams of an audio signal processing apparatus for processing an object signal using reverse control according to another embodiment of the present invention.

Referring to FIG. 6, the audio signal processing apparatus can include a reverse process controlling unit 610, a parameter generating unit 620, a remix rendering unit 630 and a reverse processing unit 640.

The determination for whether to perform reverse processing can be performed by the reverse process controlling unit 610 using $a_i/b_i$ and $c_i/d_i$. If the reverse processing is performed according to the determination, the parameter generating unit 620 generates corresponding weighting factors w11~w22, calculates a reverse processing gain value by the gain compensation, and then transmits the calculated value to the reverse processing unit 640. And, the remix rendering unit 630 performs rendering based on the weighting factors.

For instance, assume that $a_i/b_i$ and $c_i/d_i$ are given as follows: $a_i/b_i$={1/1, 1/1, 1/0. 0/1}; and $c_i/d_i$=(1/1, 0.1/0.1, 0.1/0, 0/0.1). This is to suppress the rest of object signals into 1/10 except a first object signal. If so, it is able to obtain a signal closer to a more specific signal using the following reverse weighting factor ratio ($c_i$_rev/$d_i$_rev) and a reverse processing gain. In this case, $c_i$_rev/$d_i$_rev=(10/10, 1/1, 1/0, 0/1) and reverse_gain=0.1.

According to another embodiment of the present invention, flag information indicating complexity of a specific object signal can be included in a bitstream. For instance, it is able to define complex_object_flag indicating a presence or non-presence of complexity of an object signal. The presence or non-presence of complexity can be determined with reference to a fixed value or a relative value.

For instance, assume that an audio signal includes two object signals, one of the object signals is background music such as MR (music recorded) accompaniment, and the other is vocal. The background music can be a complicated object signal constructed with combination of musical instruments much more than the vocal. In this case, if the complex_object_flag information is transmitted, the reverse process controlling unit is able to determine whether to perform the reverse processing in a simple manner. In particular, if $c_i/d_i$ makes a request for implementing acapella by suppressing the background music by −24 dB, it is able to generate a specific signal by amplifying the vocal by +24 dB reversely and then setting a reverse processing gain to −24 dB, according to the flag information. This method is collectively applicable to whole time or whole bands or may be selectively applicable to a specific time or band only.

In the following description, a method of performing reverse processing in case of extreme panning occurrence according to another embodiment of the present invention is explained.

For instance, a remix request for shifting most of objects on a left channel to the right and shifting objects on a right channel to the left can be received. In this case, instead of the above-described method, it may be more efficient to perform remix in a swapped state after swapping left and right channels.

Referring to FIG. 7, the audio signal processing apparatus can include a reverse process controlling unit 710, a channel swapping unit 720, a remix rendering unit 730 and a parameter generating unit 740.

The reverse process controlling unit 710 is able to determine whether to swap object signals through the analysis of $a_i/b_i$ and $c_i/d_i$. If it is preferable to perform the swapping according to the determination, the channel swapping unit 720 performs the channel swapping. The remix rendering unit 730 performs rendering using the channel-swapped audio signal. In this case, weighting factors w11~w22 can be generated with reference to the swapped channels.

For instance, assume that $a_i/b_i$={1/0, 1/0, 0.5/0.5, 0/1} and $c_i/d_i$={0/1, 0.1/0.9, 0.5/0.5, 1/0}. If the above panning is to be performed, very extreme panning should be performed on $1^{st}$, $2^{nd}$ and $4^{th}$ object signals. In this case, if channel swapping is performed by the present invention, $1^{st}$, $3^{rd}$ and $4^{th}$ object signals need not to be changed but the $2^{nd}$ object signal needs to be finely adjusted.

This method is collectively applicable to whole time or whole bands or may be selectively applicable to a specific time or band only.

A method of processing object signals having high correlation efficiently according to another embodiment of the present invention is proposed.

It may frequently happen that object signals for remix include stereo object signals. In case of the stereo object signal, an independent parameter is transmitted by regarding each channel (L/R) as an independent mono object and remix can be performed using the transmitted parameter. Meanwhile, in the remix, it is able to transmit information indicating what kinds of two objects are coupled for a stereo object signal to construct the stereo object signal. For instance, it is able to define the information as src_type. And, it is able to transmit the src_type per object.

For another instance, there may be a case that left and right channel signals among stereo object signals have the almost same value in fact. In this case, handling the left/right channel signal as a mono object signal facilitates the remixing rather than handing the left/right channel signal as a stereo object signal and is able to reduce a bit rate required for the transmission.

For instance, if a stereo object signal is inputted, it is able to determine whether to regard it as a mono object signal or a stereo object signal within a remix encoder. And, a corresponding parameter can be included in a bit sequence. In this case, in case of processing it as the stereo object signal, a pair of $a_i/b_i$ are necessary for left and right channels, respectively. In this case, it is preferable that $b_i$ for the left channel is zero. And, it is preferable that $a_i$ for the right channel is zero. Moreover, a pair of power (Ps) of source are necessary as well.

For another instance, if left and right object signals are substantially the same signals or if they are the signals having high correlation, it is able to generate a virtual object signal resulting from a sum of the two signals. Moreover, $a_i/b_i$ and Ps are generated and transmitted with reference to the virtual object signal. If the $a_i/b_i$ and Ps are transmitted by such a method, it is able to reduce a bit rate. When rendering is performed in a decoder, it is able to omit unnecessary panning actions. Therefore, the decoder can operate more stably.

In this case, a mono downmix signal can be generated in various ways. For instance, there can be a method of adding a left object signal and a right object signal together. Alternatively, there can be a method of dividing the added object signal by a normalized gain value. Hence, according to how it is generated, values of the transmitted $a_i/b_i$ and Ps can be varied.

Moreover, it is able to transmit information capable of discriminating whether a specific object signal is mono or stereo or whether a specific object signal, which was stereo, is rendered into a mono signal by an encoder. In this case, compatibility can be maintained in case of $c_i/d_i$ interfacing in a decoder. For instance, in case of mono, it is able to determine src_type=0. In case of a left channel signal in stereo, it is able to determine src_type=1. In case of a right channel signal in stereo, it is able to determine src_type=2. In case of downmixing a stereo signal into a mono signal, it is able to determine src_type=3.

Meanwhile, a decoder can receive $c_i/d_i$ for a left channel signal and $c_i/d_i$ for a right channel signal for the control of a stereo object signal. In case of 'src_type=3' of object signal, it may be preferable that the $c_i/d_i$ for the left channel signal and the $c_i/d_i$ for the right channel signal are added together. A type of the addition can adopt the method of generating the virtual object signal.

This method is collectively applicable to whole time or whole bands or may be selectively applicable to a specific time or band only.

According to another embodiment of the present invention, in case that each object signal is matched to each channel signal by 1:1, it is able to reduce a quantity of transmission using flag information. In this case, rendering can be performed through a simple mix process rather than applying every remix algorithm for actual rendering.

For example, if there are two objects signals Obj 1 and Obj 2 and if $a_i/b_i$ for the Obj 1 and Obj 2 is {1/0, 0/1}, the Obj 1 exists in a left channel signal of a mixed signal only and the Obj 2 exists in a right channel signal of the mixed signal only. In this case, since a source power (Ps) can be extracted from the mixed signal, it needs not to be separately transmitted. Moreover, in case of performing rendering, weighting factors (w11~w22) can be directly obtained from the relations of $c_i/d_i$ and $a_i/b_i$ and an operation using PS is not separately requested. Therefore, in case of the above example, processing is further facilitated using relevant flag information.

Figure 8:
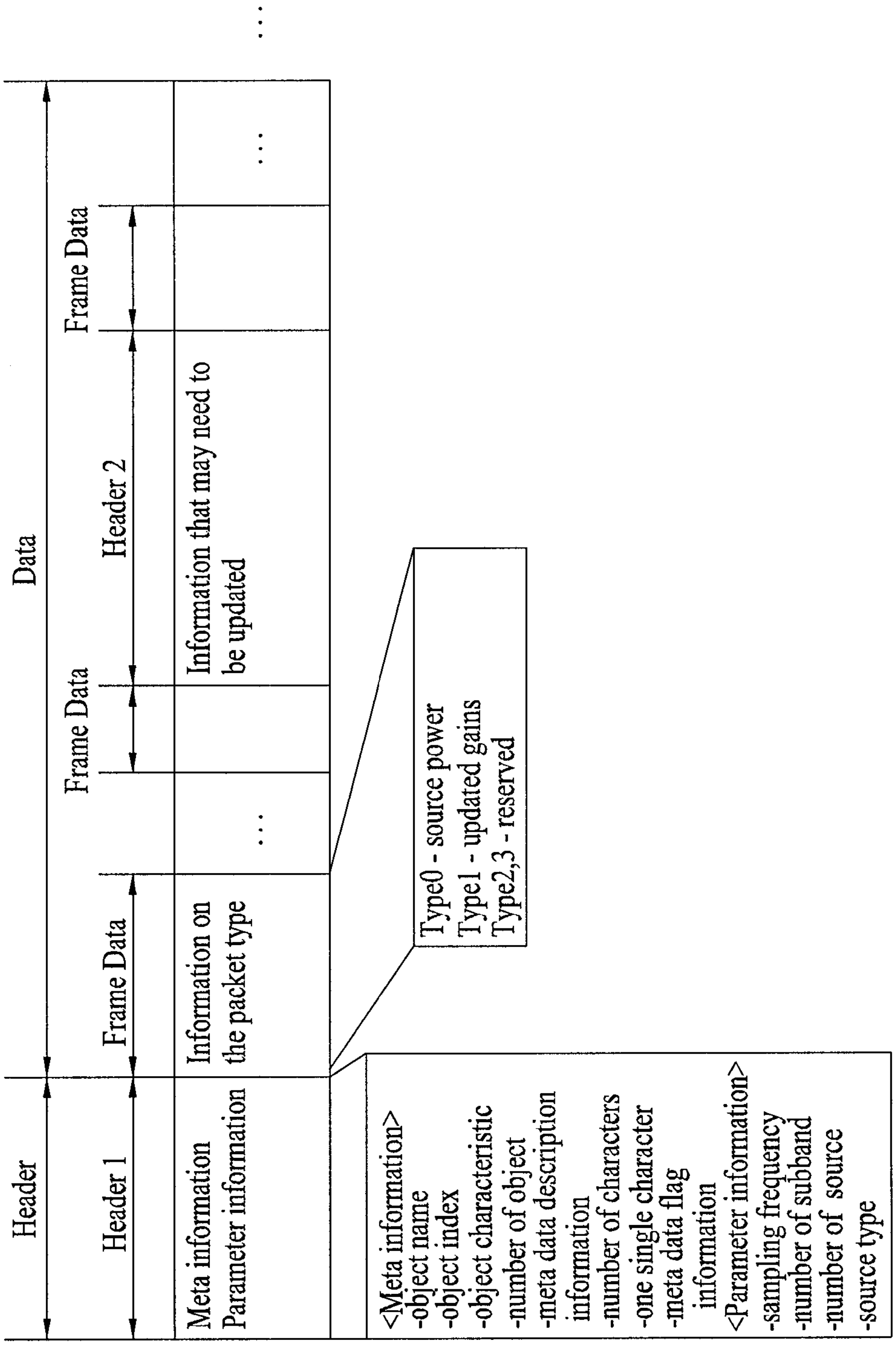
FIG. 8 is a structural diagram of bitstream containing meta information on object according to an embodiment of the present invention.

FIG. 8 is a structural diagram of bitstream containing meta information on object according to an embodiment of the present invention.

In object-based audio coding, meta information on object can be received. For instance, in the process for downmixing a plurality of objects into mono or stereo signals, meta information can be extracted from each of the object signals. And, the metal information can be controlled by a selection made by a user.

In this case, the meta information may mean meta data. In particular, the meta data is the data about data and may mean the data for describing the attribute of information resource. Namely, the meta data, which is not the data (e.g., video, audio, etc.) itself to be substantially stored, means the data for providing information directly or indirectly associated with the corresponding data. If such a meta data is used, it is able to check whether user-specific data is correct and specific data can be found easily and quickly. Namely, management facilitation is guaranteed in aspect of possessing data or search facilitation is guaranteed in aspect of using data.

In object-based audio coding, the meta information may mean the information indicating attribute of object. For instance, the meta information is able to indicate whether each of a plurality of object signals constructing a sound source corresponds to a vocal object or a background object. And, the meta information is able to indicate whether the vocal object is an object for a left channel or a right channel. Moreover, the meta information is able to indicate the background object corresponds to a piano object, a drum object, a guitar object or other musical instrument object.

Meanwhile, a bitstream may mean a bundle of parameters or data or can mean a general bitstream compressed for transmission or storage. Moreover, the bitstream can be interpreted in a broad meaning to indicate a type of parameter before being represented as the bitstream. A decoding device is able to obtain object information from the object-based bitstream. In the following description, information included in the object-based will be explained.

Referring to FIG. 8, an object-based bitstream can include a header and data. The header 1 can include meta information, parameter information and the like. The meta information can include the following information. For instance, the meta information can include an object name, an object index indicating an object, detailed attribute information on object (object characteristic), information on number of objects, meta data description information, information on number of meta data characters (number of characters), character information of meta data (one single character), meta data flag information and the like.

In this case, the object name may mean the information indicating attribute of such an object as a vocal object, a musical instrument object, a guitar object, a piano object and the like. The object index indicating an object may mean the information for assigning an index to attribute information on object. For instance, an index is assigned to each musical instrument name to define a table in advance. The detailed attribute information on object (object characteristic) may mean the individual attribute information on a sub-object. In this case, the sub-object may mean each of similar objects when the similar objects are grouped into a single group object. For instance, in case of a vocal object, there are information indicating a left channel object and information indicating a right channel object.

Moreover, the number information of objects (number of object) may mean the number of objects for transmitting object-based audio signal parameters. The meta data description information may mean the description information of meta data for an encoded object. The character information of meta data (one single character) may mean each character of meta data of a single object. The meta data flag information may mean a flag indicating whether meta data information of encoded objects will be transmitted.

Meanwhile, the parameter information can include a sampling frequency, the number of subbands, the number of source signals, a source type and the like. And, the parameter information can selectively include playback configuration information of a source signal.

The data can include at least one frame data. If necessary, the data can include a header (Header 2) together with the frame data. In this case, the Header 2 can include informations that need to be updated.

The frame data is able to include information on a data type included in each frame. For instance, in case of a first data type (Type 0), the frame data can include minimum information. In particular, the frame data can include source power associated with side information only. In case of a second data type (Type 1), the frame data can include additionally updated gains. In case of a third or fourth data type, the frame data can be allocated as a reserved area for a future use. If the bitstream is used for a broadcast, the reserved area can include information (e.g., sampling frequency, number of subband, etc.) necessary to match a tuning of a broadcast signal.

FIG. 9 is a diagram of syntax structure for transmitting an audio signal efficiently according to an embodiment of the present invention.

Source powers (Ps) are transported as many as the number of partitions (frequency bands) within a frame. The partition is a non-uniform band based on a psychological sound model. And, about 20 partitions are used in general. Hence, 20 source powers are transported per source signal. Every quantized source power has a positive value. And, transporting the source power by differential coding is more advantageous than transporting the source power as a linear PCM signal. Moreover, the source power can be selectively transported by selecting an optimal one of time differential coding, frequency differential coding and PBC (pilot-based coding). In case of a stereo source, it is able to send a difference value from a coupled source. N this case, the difference value of the source power can have a positive or negative sign.

The differential-coded source power value is transported through Huffman coding. In this case, a Huffman coding table includes a table dealing with positive values only or a table dealing with both of the positive and negative values. In case of using an unsigned table having the positive values only, a bit corresponding to a sign is separately transported.

The present invention proposes a method of transporting a sign bit in using an unsigned Huffman table.

Without transporting a sign bit for each difference value sample, it is able to collectively transport sign bit(s) for 20 difference values corresponding to a single partition. In this case, it is able to transport a flag uni_sign indicating whether a same sign is used for the transported sign bit(s). If the uni_sign is set to 1, it means that signs of the 20 difference values are equal to each other. If so, without transporting a per-sample sign bit, a 1-bit full sign bit is transported only. If the uni_sign is set to 0, a sign bit is transported per difference value. In this case, the sign bit is not transported for a sample having the difference value set to 0. If the 20 difference values are all zero, the flag uni_sign is not transported.

By the above method, it is able to reduce the number of bits required for the sign bit transmission in an area where signs have the same difference values, respectively. In case of a real source power value, since a source signal has a transient characteristic in a time domain, a time difference value frequently has a single sign. Therefore, the signal transmitting method according to the present invention has good efficiency.

Figure 10:
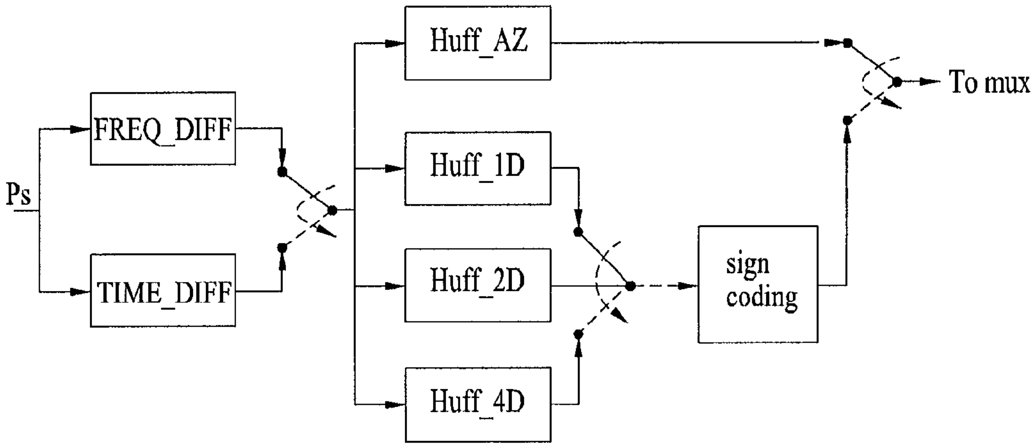
FIGS. 10 to 12 are diagrams to explain a lossless coding process for transmitting source power according to an embodiment of the present invention.
Figure 11:
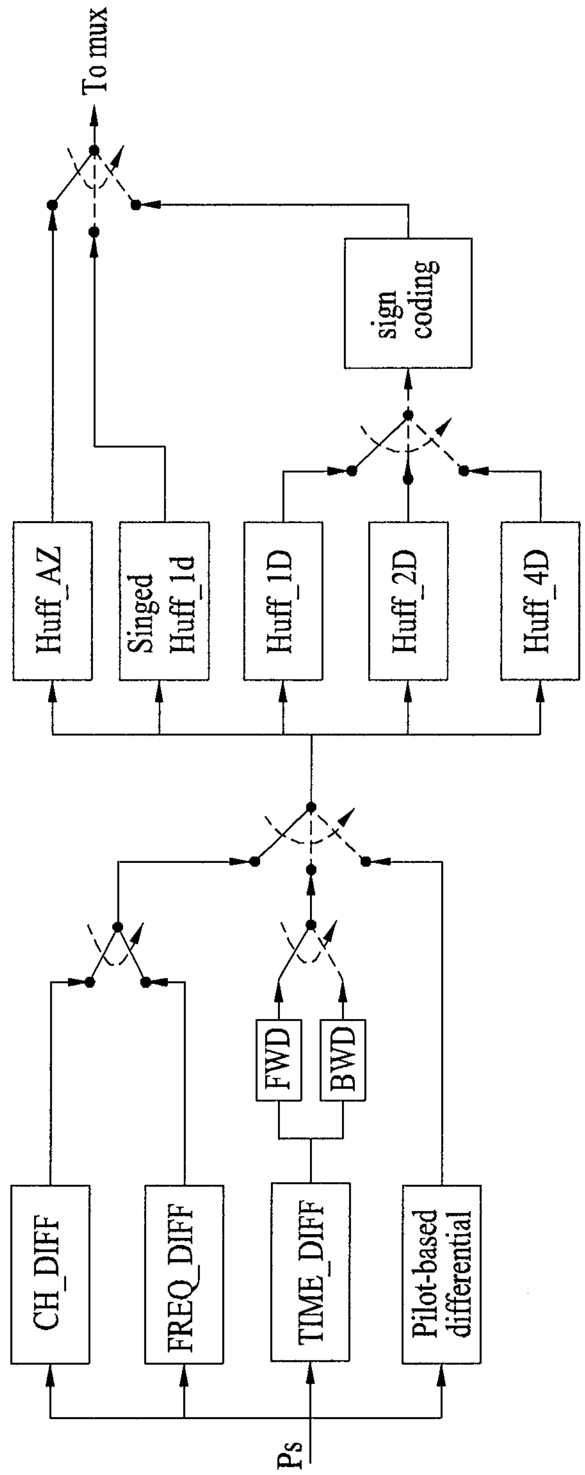
Figure 12:
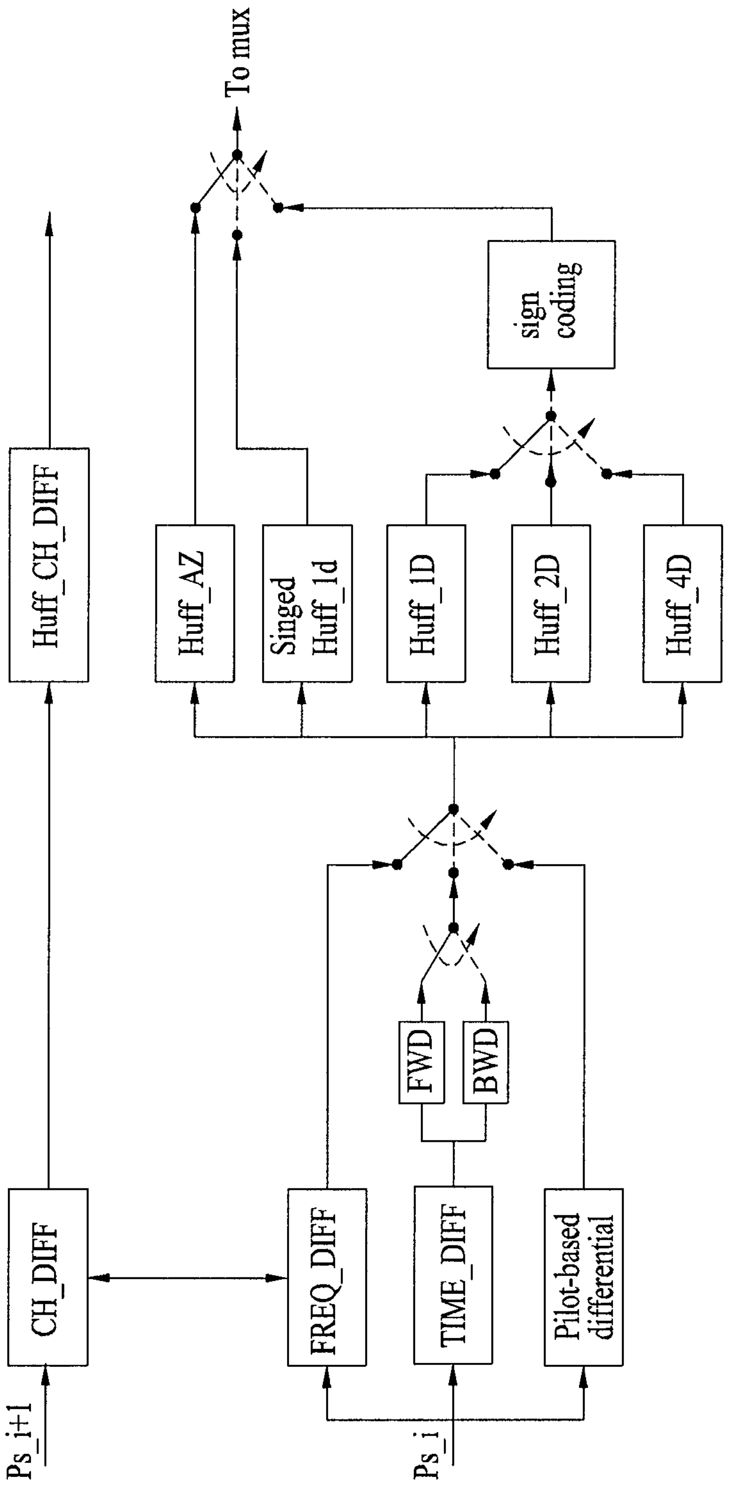

FIGS. 10 to 12 are diagrams to explain a lossless coding process for transmitting source power according to an embodiment of the present invention.

Referring to FIG. 10, a lossless coding process for transmitting a source power is shown. After a differential signal on a time or frequency axis has been generated, coding is performed on a differential PCM value using Huffman codebook most advantageous in aspect of compression.

In case of all differential values are zero, it can be regarded as a case of Huff_AZ. In this case, the difference values are not actually transmitted and a decoder is able to know that they are all zero by the fact that Huff_AZ has been adopted. It is relatively probable that a magnitude of a differential value is small. And, it is also relatively probable that a differential value has a value of zero. Therefore, 2D/4D Huffman coding method for coding each pair of two or four differential values can be efficient. Maximum absolute values for coding per table may differ from each other. Generally, it is preferable for 4D table to have a very low maximum value set to 1.

In case of unsigned Huffman coding, the sign coding method using the aforesaid uni_sign is applicable.

Meanwhile, Huffman table in each dimension is selectively available from a plurality of tables having different statistical characteristics from each other. And, it is able to use a different table according to FREQ_DIFF or TIME_DIFF. Flag indicating what kind of a differential signal or Huffman coding is used can be separately included within a bitstream.

To minimize waste in using bits, it is able to define that a specific combination of coding methods is not used using a flag. For instance, if the combination of Freq_diff and Huff_4D is rarely used, coding by the corresponding combination is not adopted.

Since the combination of flags is frequently used, it is able to additionally compress data by transmitting a corresponding index through Huffman coding.

Referring to FIG. 11, another example of a lossless coding method is shown. In a differential coding method, various examples can exist. For instance, CH_DIFF is a transmitting method using a differential value between sources corresponding to channels of a stereo object signal. And, there can exist pilot-based differential coding, time differential coding and the like. In case of the time differential coding, a coding method, in which FWD or BWD is selected to use, is added. In case of Huffman coding, signed Huffman coding is added.

Generally, in processing a stereo object signal, it is able to process each channel of an object signal as an independent object signal. For instance, the processing can be performed in a manner of regarding a first channel (e.g., a left channel) signal as an independent mono object signal of s_i and regarding a second channel (e.g., a right channel) signal as an independent mono object signal of s_i+1. If so, a power of a transported object signal becomes Ps_i or Ps_i+1. Yet, in case of a stereo object signal, characteristics between two channels are frequently similar to each other. Therefore, it may be advantageous that both of the Ps_i and the $Ps\_i_{+}1$ are considered together in coding. FIG. 10 shows an example for this coupling. Coding of Ps_i follows the method shown in FIG. 8 and FIG. 9, coding of Ps_i+1 finds a difference between the Ps_i and the Ps_i+1, and the difference is coded and transmitted.

A method of processing an audio signal using inter-channel similarity according to another embodiment of the present invention is explained as follows.

As a first embodiment, a method of using source powers and an inter-channel level difference can exist. Source power of a specific channel is quantized and then sent. Source power of another channel can be obtained from a value relative to the source power of the specific channel. In this case, the relative value can include a power ratio (e.g., Ps_i+1/Ps_i) or a differential value between values resulting from taking logarithm on power values. For instance, the differential value includes $10\log_{10}(Ps\_i+1)-10\log_{10}(Ps\_i)=10\log_{10}(Ps\_i+1/Ps\_i)$. Alternatively, it is able to transmit an index difference value after quantization.

If the above form is used, source powers of channels of a stereo signal have values very similar to each other. And, it is very advantageous for quantization and compressive transmission. If the differential value is found before the quantization, it is able to transmit a more precise source power.

As a second embodiment, a method of using source power or a sum and difference of an original signal can exist. In this case, transmission efficiency is better than that in transmitting an original channel signal. And, it may be efficient in aspect of balance of quantization error.

Referring to FIG. 12, it is able to use coupling for a specific frequency domain only. And, information on a frequency domain having coupling taken place therein can be included in a bitstream. In general, for instance, left and right channels have similar characteristics in a signal on a low frequency band. And, there may be a big difference between left and right channels in a signal on a high frequency band. Therefore, if coupling is performed on a frequency band, compression efficiency can be raised. Various methods of performing coupling are explained as follows.

For instance, coupling can be performed on a signal on a low frequency band only. In this case, since coupling is performed on a preset band only, it is unnecessary to separately transmit information on the band to which the coupling is applied. Alternatively, there can be a method of transmitting information on a coupling-performed band. Encoder arbitrarily determines a band to perform coupling thereon and the information on the coupling-performed band can be included in a bitstream.

Alternatively, there can be a method of using a coupling index. Index is given to a possible combination of coupling-occurring bands and the index is then transmitted actually. For instance, in case that processing is performed by diving a band into 20 frequency bands, it is able to know which bands are coupled according to an index shown in Table 1.

TABLE 1

| index | 0 | 1 | 2 | 3 |
|---|---|---|---|---|
| coupling | 0~3 band | 0~7 band | 0~12 band | 0~19 band |

A predetermined index can be used as the index. Alternatively, an index table can be transmitted by determining an optimal value of a corresponding content. Alternatively, it is able to use an independent value for each stereo object signal.

Method of obtaining information indicating correlation between grouped objects according to an embodiment of the present invention is explained as follows.

First of all, in processing an object-based audio signal, a single object constructing an input signal is processed as an independent object. For instance, in case of a stereo signal constructing a vocal, a left channel signal or a right channel signal is processed by being recognized as a single object each. If an object signal is configured by this method, correlation can exist between objects having the same origin. If coding is performed using the correlation, more efficient coding will be possible. For instance, correlation can exist between an object constructed with a left channel signal of a stereo signal and an object constructed with a right channel signal thereof. And, information on the correlation is transmitted to be used.

By grouping objects having the correlation in-between and by transmitting information common to the grouped objects once, more efficient coding is possible.

When a single object is a part of a stereo or plural channel object, bsRelatedTo, which is the information carried by a bitstream, can be the information indicating other objects correspond to a part of the same stereo or plural channel object. The bsRelatedTo can obtain 1-bit information from a bitstream. For instance, if bsRelatedTo[i] [j]=1, it may mean that object i and j correspond to channels of the same stereo or plural channel object.

Based on the bsRelatedTo value, it is able to check whether objects construct a group. By checking the bsRelatedTo value for each object, it is able to check the information on inter-object correlation. For the correlation-existing grouped objects, more efficient coding is possible by transmitting the same information (e.g., meta information) once.

Figure 13:
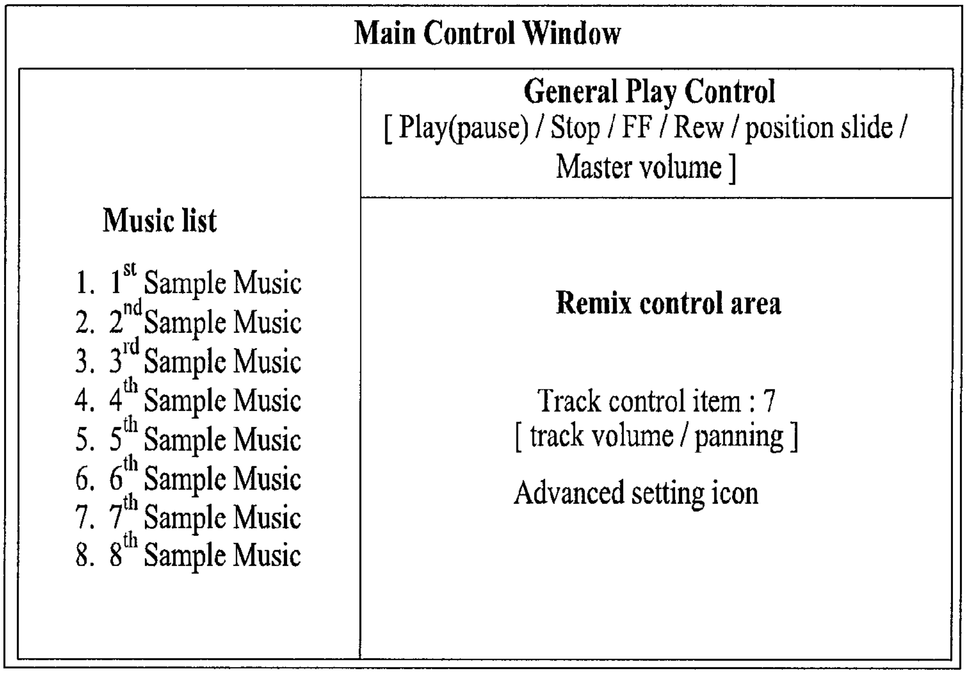
FIG. 13 is a diagram to explain a user interface according to an embodiment of the present invention.

FIG. 13 is a diagram to explain a user interface according to an embodiment of the present invention.

First of all, a main control window can include a music list area, a general play control area and a remix control area. For instance, the music list area can include at least one sample music. The general play control area can control Play, Pause, Stop, FF (fast forward), Rew (rewind), Position Slide, Volume and the like. The remix control area can include a sub-window area. The sub-window area can include an enhanced control area. And, a user-specific item can be controlled in the enhanced control area.

In case of a CD player, a user is able to listen to the music by loading a CD in the CD player. In case of a PC player, if a user loads a disc in a PC, a remix player is automatically executed. And, a music to be played can be selected from a file list of the player. The player reads PCM sound source recorded in the CD and a file *.rms to play automatically. The layer is able to perform a full remix control as well as a general play control. For examples of the full remix control, there is a track control or a panning control. And, an easy remix control may be available. In case of entering an easy remix control mode, several functions are controllable. For instance, the easy remix control mode may mean an easy control window capable of easily controlling a specific object such as karaoke and acapella. In the sub-window area, a user is able to perform a detailed control.

As mentioned in the foregoing description, a signal processing apparatus according to the present invention is provided to a transmitter/receiver of multimedia broadcasting such as DMB (digital multimedia broadcasting) and is used in decoding an audio signal, a data signal and the like. Moreover, the multimedia broadcast transmitter/receiver can include a mobile communication terminal.

Moreover, a signal processing apparatus according to the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the signal processing method is stored in a computer-readable recording medium or can be transported via wireline/wireless communication network.

Industrial Applicability

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing an audio signal, comprising:

receiving a downmix signal of at least one downmixed object signal;

obtaining side information including object information and coupling information, and mix information;

determining whether to perform a reverse process using the object information and the mix information;

obtaining a reverse process gain value for gain compensation when the reverse process is performed according to the determination;

generating downmix processing information and plural channel information based on the object information and the mix information, wherein the downmix processing information is usable for controlling at least one of object panning and object gain;

generating a processed downmix signal based on the received downmix signal and the downmix processing information, wherein a number of channels of the processed downmix signal is the same to that of the downmix signal; and generating an output channel signal based on the processed downmix signal and the plural channel information, wherein the object signal is discriminated into an independent object signal and a background object signal, wherein the object information includes at least one of level information of the object signal, correlation information of the object signal and gain information of the object signal, wherein the correlation information of the object signal is obtained based on the coupling information, and wherein if the number of modified objects is greater than that of non-modified objects, the reverse process indicates that the gain compensation is performed with reference to the non-modified objects and wherein the output channel signal is generated based on the reverse process gain value.

2. The method of claim 1, wherein the independent object signal includes a vocal object signal.

3. The method of claim 1, wherein the background object signal includes an accompaniment object signal.

4. The method of claim 1, wherein the background object signal includes at least one channel-based signal.

5. The method of claim 1, wherein the object signal is discriminated into the independent object signal and the background object signal based on flag information.

* * * * *